United States Patent

Nakamura et al.

[11] Patent Number: 6,026,211
[45] Date of Patent: Feb. 15, 2000

[54] VIDEO RECORDING AND REPRODUCING APPARATUS FOR RECORDING A VIDEO SIGNAL AND AN INDEXING SIGNAL

[75] Inventors: Akihiko Nakamura, Osaka; Makoto Gotou, Nishinomiya; Tatsuro Juri, Osaka, all of Japan

[73] Assignee: Matsushita Electric Industries, Ltd., Osaka, Japan

[21] Appl. No.: 09/172,010

[22] Filed: Oct. 14, 1998

Related U.S. Application Data

[63] Continuation of application No. 08/801,181, Feb. 18, 1997, which is a continuation of application No. 08/260,998, Jun. 16, 1994, abandoned.

[30] Foreign Application Priority Data

| Jun. 18, 1993 | [JP] | Japan | 5-147348 |
| Jun. 24, 1993 | [JP] | Japan | 5-153233 |
| Jul. 16, 1993 | [JP] | Japan | 5-176444 |
| Jul. 30, 1993 | [JP] | Japan | 5-189981 |
| Jul. 30, 1993 | [JP] | Japan | 5-189983 |

[51] Int. Cl.$^7$ .................................................... H04N 5/76
[52] U.S. Cl. .................................................. 386/46; 386/95
[58] Field of Search ...................... 386/1, 45, 6, 46, 386/68–70, 81–82, 95, 113, 124, 125–126, 40, 63, 52, 57, 65; 360/18, 20, 40, 21, 27, 32, 48, 49, 72.1, 72.2; H04N 5/76, 5/92, 9/79

[56] References Cited

U.S. PATENT DOCUMENTS

| 5,046,167 | 9/1991 | Nakano et al. . |
| 5,223,991 | 6/1993 | Nagal et al. . |
| 5,408,364 | 4/1995 | Watanabe et al. . |
| 5,432,646 | 7/1995 | Nakamura et al. . |

FOREIGN PATENT DOCUMENTS

| 0341319 | 11/1989 | European Pat. Off. . |
| 0454464 | 10/1991 | European Pat. Off. . |
| 0499464 | 8/1992 | European Pat. Off. . |
| 0518069 | 12/1992 | European Pat. Off. . |
| 0524007 | 1/1993 | European Pat. Off. . |
| 3831291 | 3/1989 | Germany . |
| 6437747 | 2/1989 | Japan . |

OTHER PUBLICATIONS

Patent Abstracts of Japan, vol. 13, No. 228 (P–877).

*Primary Examiner*—Thai Tran
*Attorney, Agent, or Firm*—Greenblum & Bernstein, P.L.C.

[57] ABSTRACT

A recording and reproducing apparatus is disclosed in which video signal and indexing signal are separately recorded in video signal areas and subcode areas, respectively, of diagonal tracks formed on a tape by a rotating head. The apparatus has a tape driver for driving the tape, add/erase command keys for generating add/erase command to add/erase the indexing signal, an indexing signal control for setting and resetting the indexing signal, and a recording device for recording the video signal to the video signal area and, if any, the indexing signal to the subcode area of each track. An editing control is provided for controlling the indexing signal control in response to the add/erase command such that the indexing signal is first recorded as a reset state for a first predetermined amount and then recorded as a set state.

7 Claims, 16 Drawing Sheets

FIG. 2
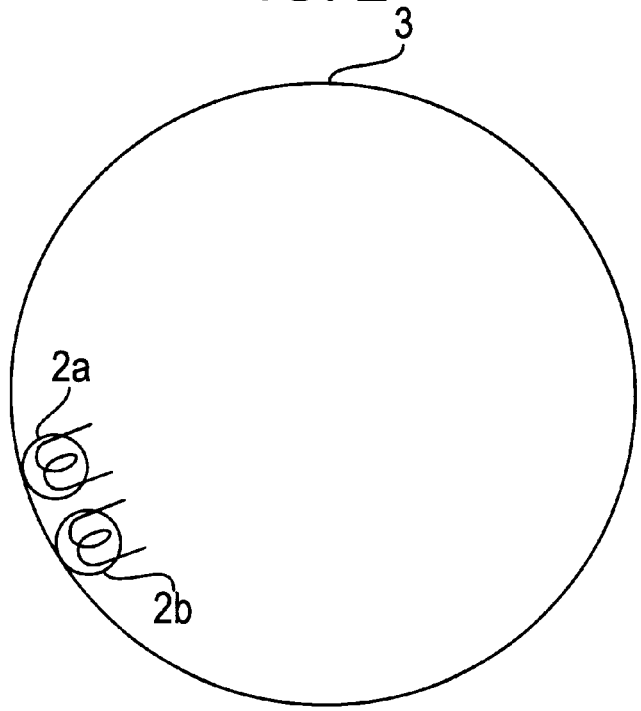
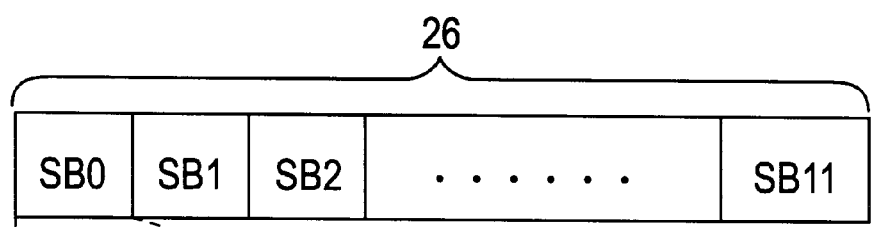
FIG. 3A
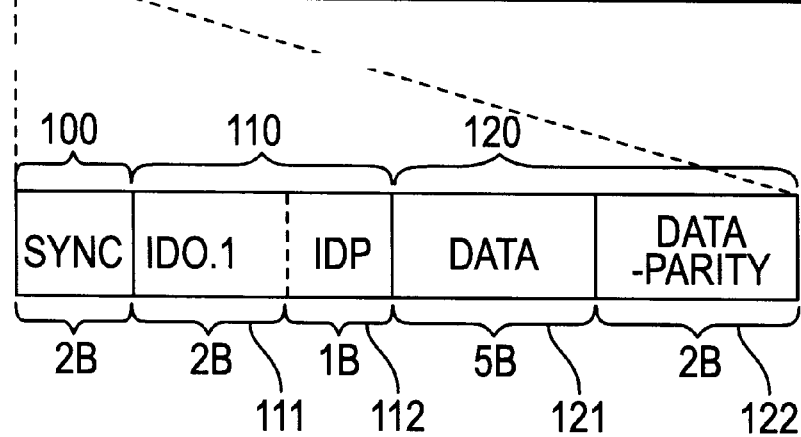
FIG. 3B

FIG. 4

| | ID 0 | | | | ID 1 | | |
|---|---|---|---|---|---|---|---|
| ID DATA1 | 4BIT | 2BIT | 1BIT | 1BIT | 4BIT | 4BIT | |
| TRACK 0 | SB NO. | 00 | SRID | PN2 | PN1 | PN0 | ABS. POSITION INF. |
| TRACK 1 | SB NO. | 00 | SRID | PN2 | PN1 | PN0 | ABS. POSITION INF. |
| TRACK 2 | SB NO. | 00 | SRID | PN2 | PN1 | PN0 | ABS. POSITION INF. |
| TRACK 3 | SB NO. | 01 | 0 | 0 | APID | COID | ABS. POSITION INF. |
| ID DATA2 TRACK 4 | SB NO. | 01 | 0 | 0 | APID | COID | ABS. POSITION INF. |
| TRACK 5 | SB NO. | 10 | 0 | 0 | APID | COID | USER INF. |
| TRACK 6 | SB NO. | 10 | 0 | 0 | APID | COID | USER INF. |
| TRACK 7 | SB NO. | 11 | SRID | PN2 | PN1 | PN0 | USER INF. |
| TRACK 8 | SB NO. | 11 | SRID | PN2 | PN1 | PN0 | USER INF. |
| ID DATA1 TRACK 9 | SB NO. | 11 | SRID | PN2 | PN1 | PN0 | USER INF. |
| TRACK 0 | SB NO. | 00 | SRID | PN2 | PN1 | PN0 | ABS. POSITION INF. |
| TRACK 1 | SB NO. | 00 | SRID | PN2 | PN1 | PN0 | ABS. POSITION INF. |
| TRACK 2 | SB NO. | 00 | SRID | PN2 | PN1 | PN0 | ABS. POSITION INF. |
| TRACK 3 | SB NO. | 01 | 0 | 0 | APID | COID | ABS. POSITION INF. |
| ID DATA2 TRACK 4 | SB NO. | 01 | 0 | 0 | APID | COID | ABS. POSITION INF. |
| TRACK 5 | SB NO. | 10 | 0 | 0 | APID | COID | USER INF. |
| TRACK 6 | SB NO. | 10 | 0 | 0 | APID | COID | USER INF. |
| TRACK 7 | SB NO. | 11 | SRID | PN2 | PN1 | PN0 | USER INF. |
| TRACK 8 | SB NO. | 11 | SRID | PN2 | PN1 | PN0 | USER INF. |
| ID DATA1 TRACK 9 | SB NO. | 11 | SRID | PN2 | PN1 | PN0 | USER INF. |
| TRACK 0 | SB NO. | 00 | SRID | PN2 | PN1 | PN0 | ABS. POSITION INF. |
| TRACK 1 | SB NO. | 00 | SRID | PN2 | PN1 | PN0 | ABS. POSITION INF. |
| TRACK 2 | SB NO. | 00 | SRID | PN2 | PN1 | PN0 | ABS. POSITION INF. |
| TRACK 3 | SB NO. | 01 | 0 | 0 | APID | COID | ABS. POSITION INF. |
| ID DATA2 TRACK 4 | SB NO. | 01 | 0 | 0 | APID | COID | ABS. POSITION INF. |
| TRACK 5 | SB NO. | 10 | 0 | 0 | APID | COID | USER INF. |
| TRACK 6 | SB NO. | 10 | 0 | 0 | APID | COID | USER INF. |
| TRACK 7 | SB NO. | 11 | SRID | PN2 | PN1 | PN0 | USER INF. |
| ID DATA1 TRACK 8 | SB NO. | 11 | SRID | PN2 | PN1 | PN0 | USER INF. |
| TRACK 9 | SB NO. | 11 | SRID | PN2 | PN1 | PN0 | USER INF. |

FIG. 5

| | SB0 | SB1 | SB2 | SB3 | SB4 | SB5 | SB6 | SB7 | SB8 | SB9 | SB10 | SB11 |
|---|---|---|---|---|---|---|---|---|---|---|---|---|
| TRACK 0 | ATC | TC | ATC | TC | ATC | TC | ATC | TC | ATC | TC | ATC | TC |
| TRACK 1 | ATC | TC | ATC | TC | ATC | TC | ATC | TC | ATC | TC | ATC | TC |
| TRACK 2 | ATC | TC | ATC | TC | ATC | TC | ATC | TC | ATC | TC | ATC | TC |
| TRACK 3 | ATC | TC | ATC | TC | ATC | TC | ATC | TC | ATC | TC | ATC | TC |
| TRACK 4 | ATC | TC | ATC | TC | ATC | TC | ATC | TC | ATC | TC | ATC | TC |
| TRACK 5 | T1 | T2 | T1 | T2 | T1 | T2 | T1 | T2 | T1 | T2 | T1 | T2 |
| TRACK 6 | T1 | T2 | T1 | T2 | T1 | T2 | T1 | T2 | T1 | T2 | T1 | T2 |
| TRACK 7 | T1 | T2 | T1 | T2 | T1 | T2 | T1 | T2 | T1 | T2 | T1 | T2 |
| TRACK 8 | T1 | T2 | T1 | T2 | T1 | T2 | T1 | T2 | T1 | T2 | T1 | T2 |
| TRACK 9 | T1 | T2 | T1 | T2 | T1 | T2 | T1 | T2 | T1 | T2 | T1 | T2 |

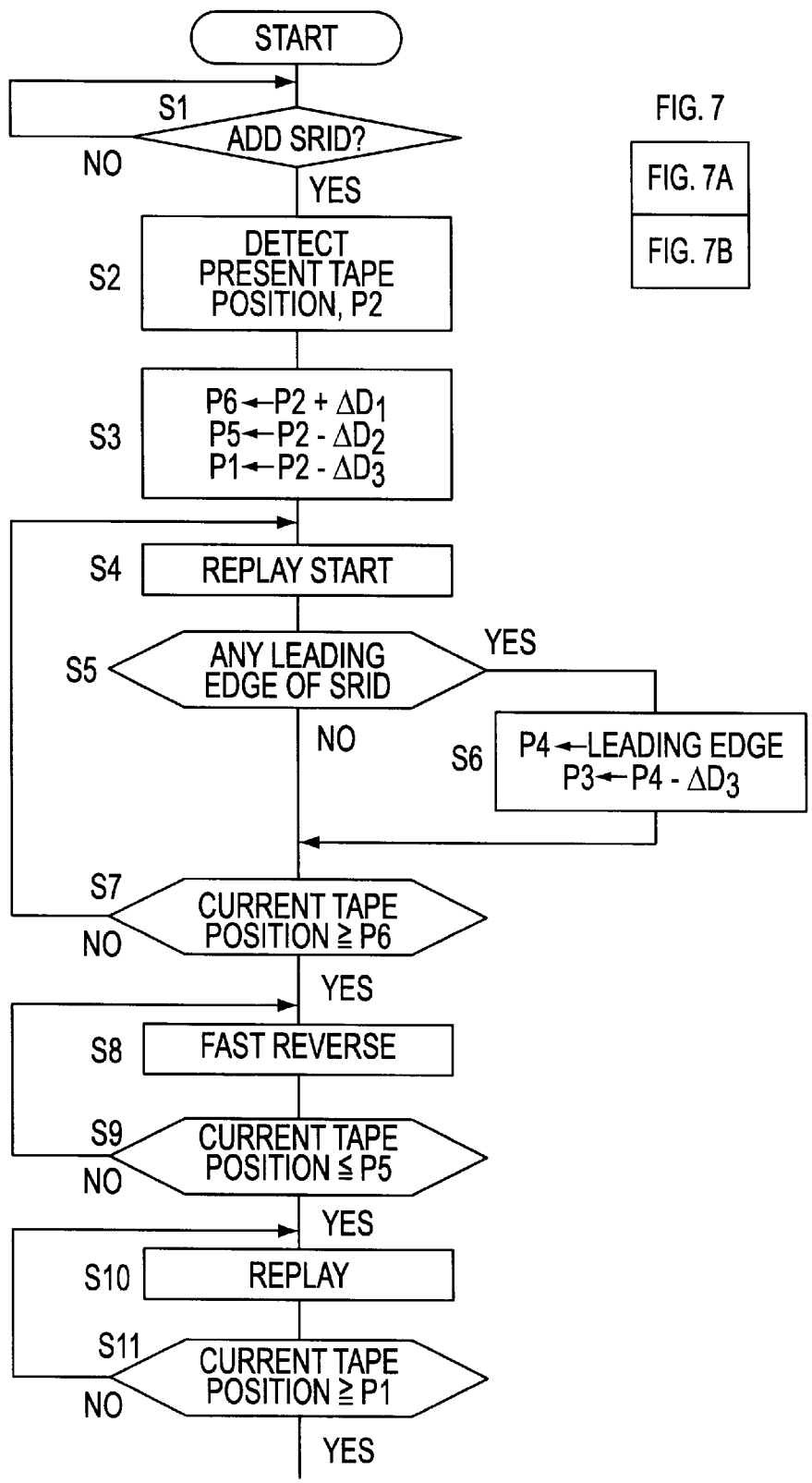

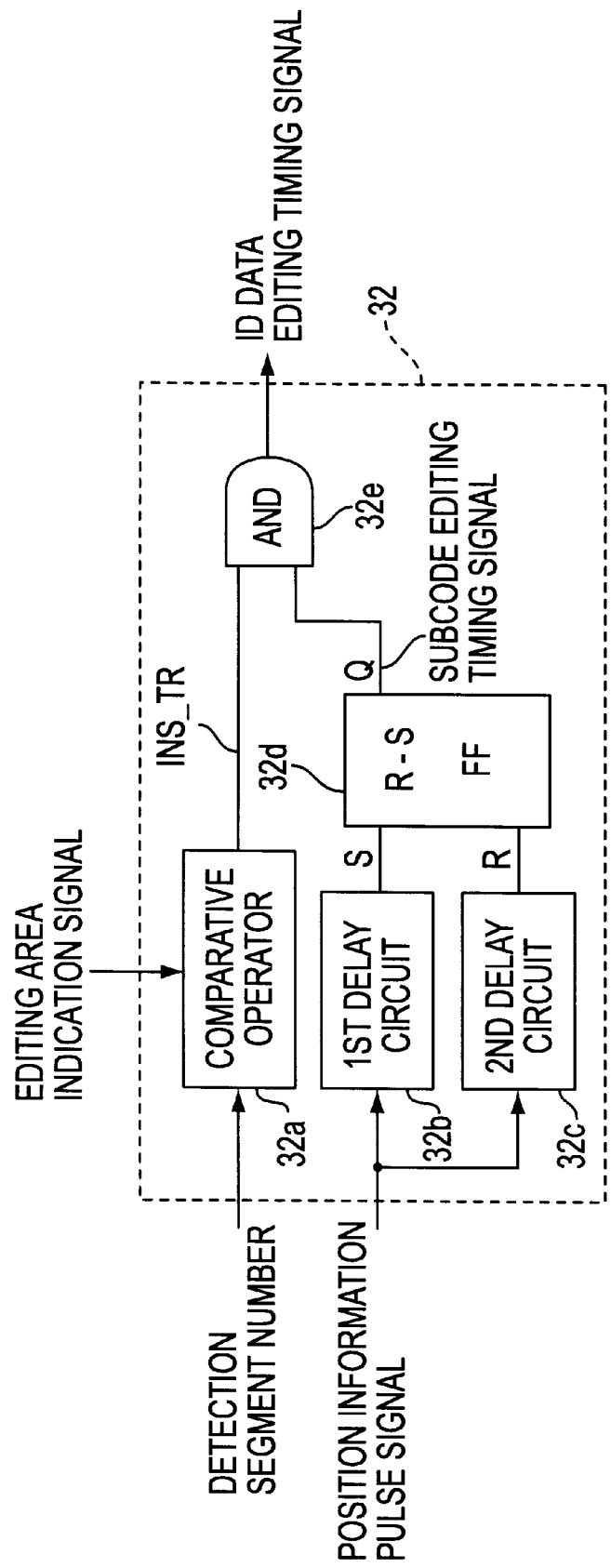

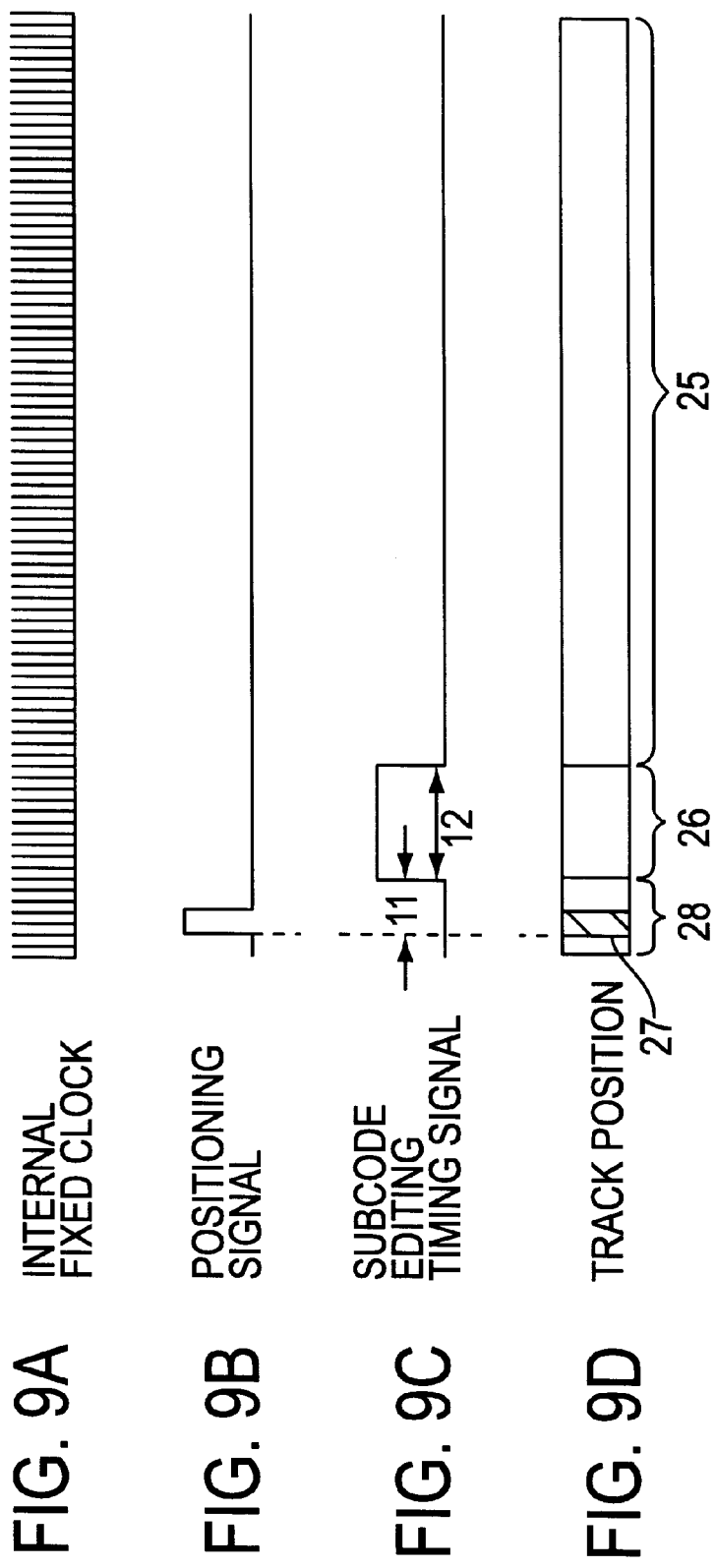

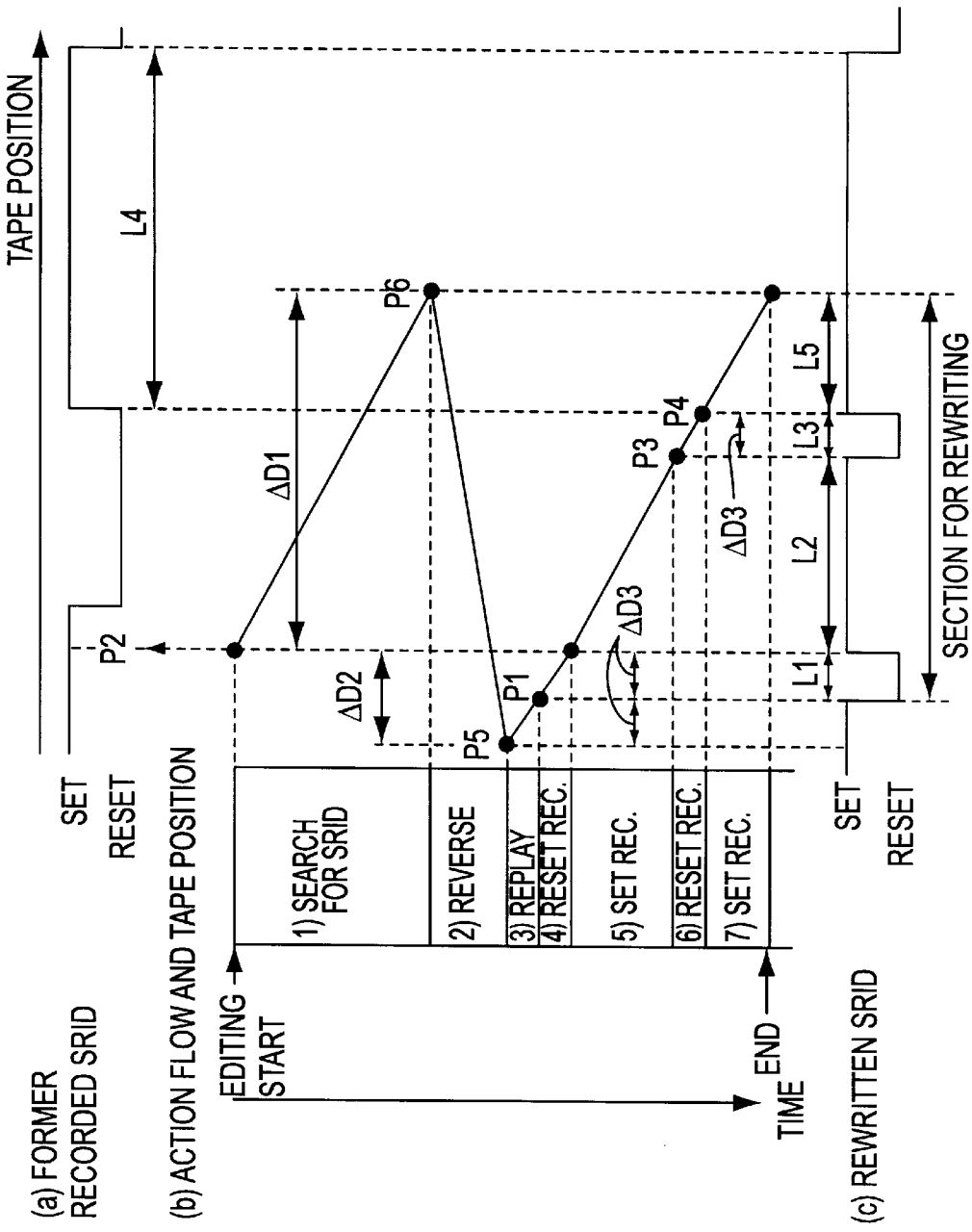

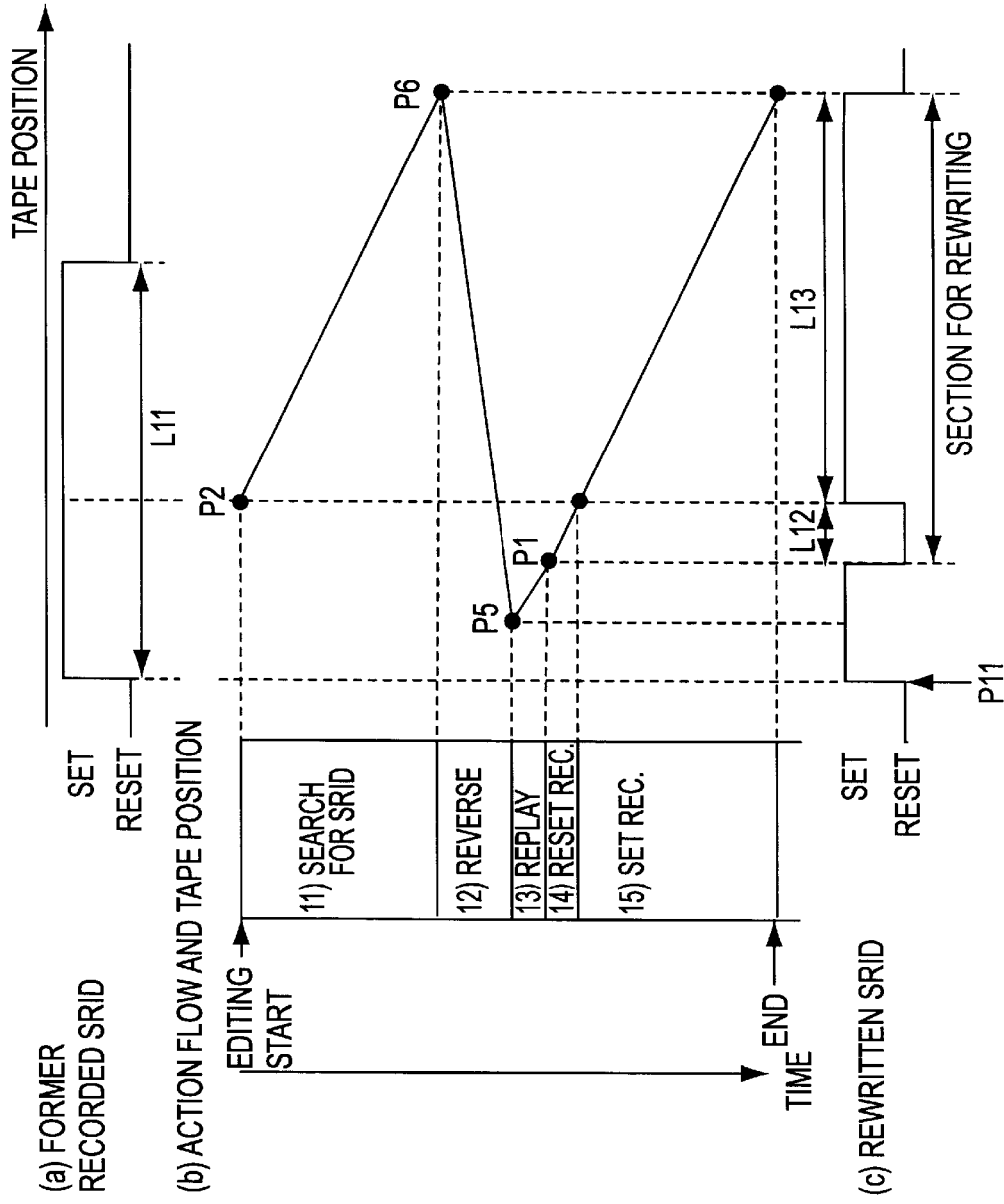

FIG. 11

| | ID 0 | | | | ID 1 | | |
|---|---|---|---|---|---|---|---|
| | 4BIT | 2BIT | 1BIT | 1BIT | 4BIT | 4BIT | |
| TRACK 0 | SB NO. | 00 | SRID | PHID | APID | PN0 | ABS. POSITION INF. |
| TRACK 1 | SB NO. | 00 | SRID | PHID | APID | PN0 | ABS. POSITION INF. |
| TRACK 2 | SB NO. | 00 | SRID | PHID | APID | PN0 | ABS. POSITION INF. |
| TRACK 3 | SB NO. | 00 | SRID | PHID | APID | PN0 | ABS. POSITION INF. |
| TRACK 4 | SB NO. | 00 | SRID | PHID | APID | PN0 | ABS. POSITION INF. |
| TRACK 5 | SB NO. | 10 | SRID | PHID | APID | PN0 | USER INF. |
| TRACK 6 | SB NO. | 10 | SRID | PHID | APID | PN0 | USER INF. |
| TRACK 7 | SB NO. | 10 | SRID | PHID | APID | PN0 | USER INF. |
| TRACK 8 | SB NO. | 10 | SRID | PHID | APID | PN0 | USER INF. |
| TRACK 9 | SB NO. | 10 | SRID | PHID | APID | PN0 | USER INF. |
| TRACK 0 | SB NO. | 00 | SRID | PHID | APID | PN0 | ABS. POSITION INF. |
| TRACK 1 | SB NO. | 00 | SRID | PHID | APID | PN0 | ABS. POSITION INF. |
| TRACK 2 | SB NO. | 00 | SRID | PHID | APID | PN0 | ABS. POSITION INF. |
| TRACK 3 | SB NO. | 00 | SRID | PHID | APID | PN0 | ABS. POSITION INF. |
| TRACK 4 | SB NO. | 00 | SRID | PHID | APID | PN0 | ABS. POSITION INF. |
| TRACK 5 | SB NO. | 10 | SRID | PHID | APID | PN0 | USER INF. |
| TRACK 6 | SB NO. | 10 | SRID | PHID | APID | PN0 | USER INF. |
| TRACK 7 | SB NO. | 10 | SRID | PHID | APID | PN0 | USER INF. |
| TRACK 8 | SB NO. | 10 | SRID | PHID | APID | PN0 | USER INF. |
| TRACK 9 | SB NO. | 10 | SRID | PHID | APID | PN0 | USER INF. |
| TRACK 0 | SB NO. | 00 | SRID | PHID | APID | PN0 | ABS. POSITION INF. |
| TRACK 1 | SB NO. | 00 | SRID | PHID | APID | PN0 | ABS. POSITION INF. |
| TRACK 2 | SB NO. | 00 | SRID | PHID | APID | PN0 | ABS. POSITION INF. |
| TRACK 3 | SB NO. | 00 | SRID | PHID | APID | PN0 | ABS. POSITION INF. |
| TRACK 4 | SB NO. | 00 | SRID | PHID | APID | PN0 | ABS. POSITION INF. |
| TRACK 5 | SB NO. | 10 | SRID | PHID | APID | PN0 | USER INF. |
| TRACK 6 | SB NO. | 10 | SRID | PHID | APID | PN0 | USER INF. |
| TRACK 7 | SB NO. | 10 | SRID | PHID | APID | PN0 | USER INF. |
| TRACK 8 | SB NO. | 10 | SRID | PHID | APID | PN0 | USER INF. |
| TRACK 9 | SB NO. | 10 | SRID | PHID | APID | PN0 | USER INF. |

113 114 115 131 118 132   121
111

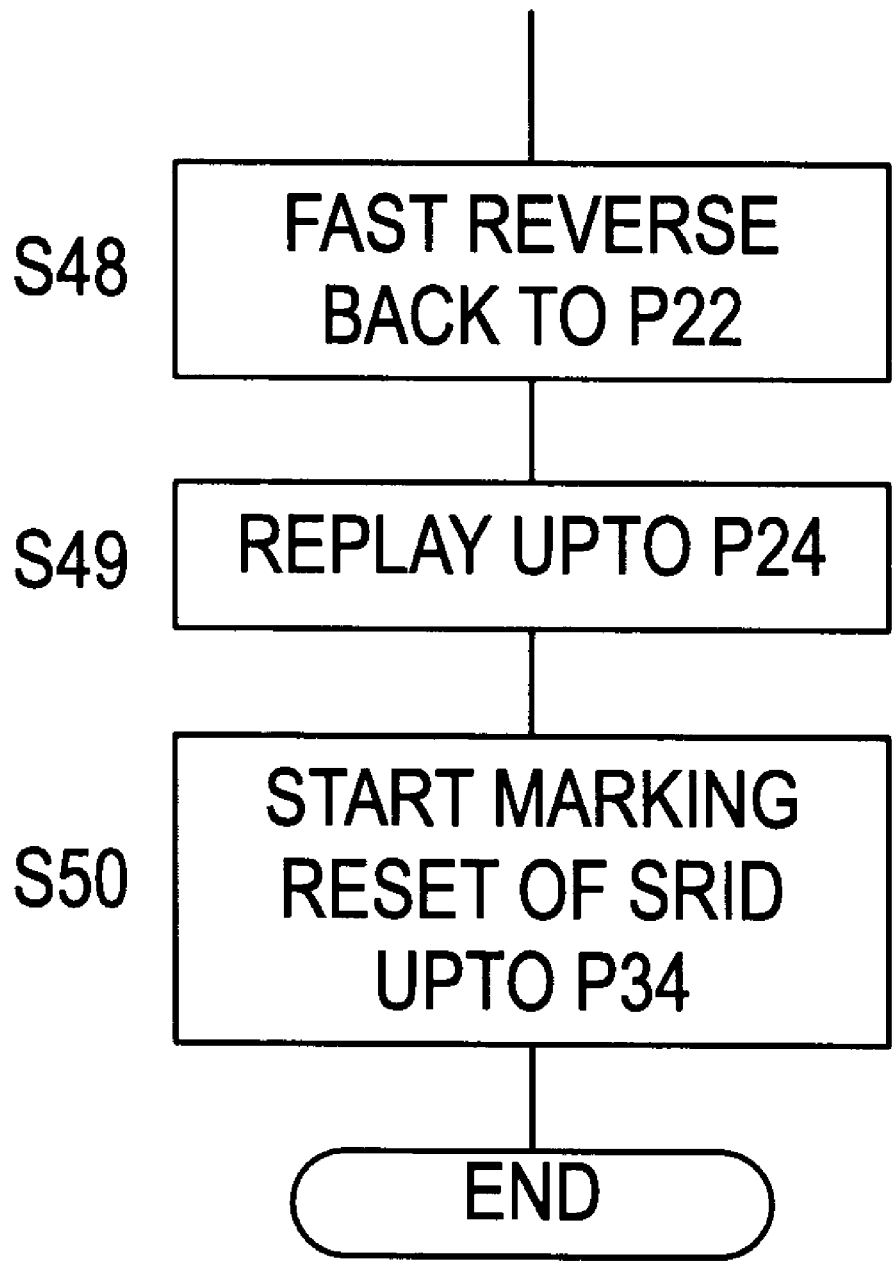

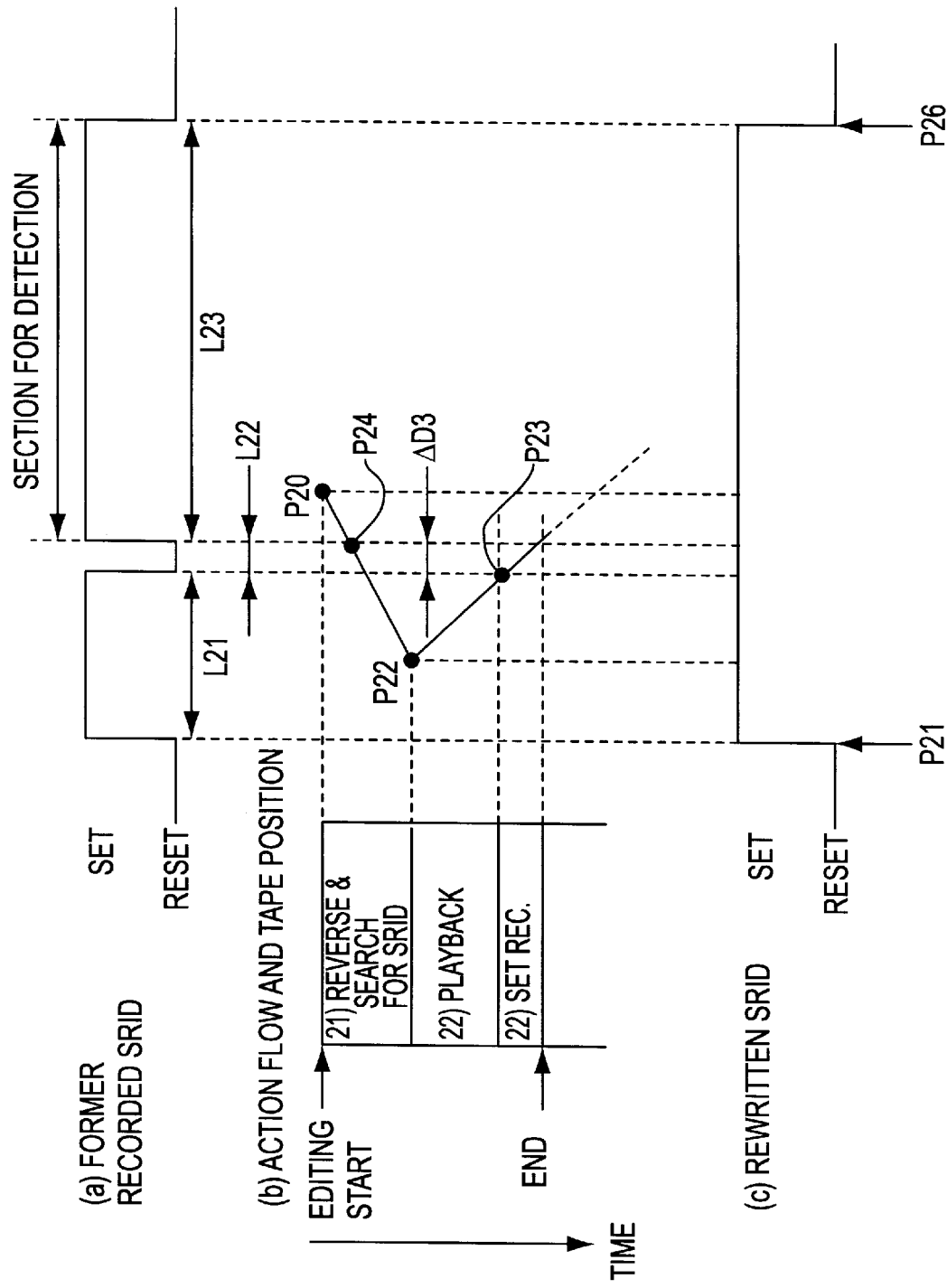

VIDEO RECORDING AND REPRODUCING APPARATUS FOR RECORDING A VIDEO SIGNAL AND AN INDEXING SIGNAL

This application is a continuation application of U.S. application Ser. No. 08/801,181, filed Feb. 18, 1997, pending, which is a continuation application of U.S. application Ser. No. 08/260,998, filed Jun. 16, 1994, abandoned, the contents of both are expressly herein incorporated by reference in their entireties.

BACKGROUND OF THE INVENTION

1. Field of the Invention

The present invention relates to a recording and reproducing apparatus for recording a video signal together with indexing information to tape, and for reproducing the recorded information by means of rotating heads, and particularly to a recording and reproducing apparatus for recording editable indexing information.

2. Description of the Prior Art

Video cassette recorders (VCR) and other recording and reproducing apparatuses using a tape medium are now widely and commonly available. Further reductions in device size enabled by high density recording techniques and digital technologies are also being developed. In digital media such as these, a subcode is usually also recorded when recording the data signal. This subcode is an integral part of the complete data signal, and may be or include an indexing ID showing the recording start position of the data, an absolute time code showing the absolute position of the data on tape, or a user-defined time code. Examples of devices recording such a subcode include DAT (Digital Audio Tape recorders) and 8 mm VCRs. It is commonly known that the DAT and 8 mm VCR standards specify an editable subcode that can be separately re-recorded while preserving the recorded video signal and audio signal.

The following problems, however, have existed with this conventional subcode, particularly when rewriting the indexing information.

For example, let us assume that a 9-sec. indexing ID is recorded to a certain position on tape. The fixed (predetermined) recording time of the indexing ID is determined with respect to the signal detection capacity during high speed searches, and it follows that the detection capacity increases relative to the length of the indexing ID recording time. This characteristic is particularly strong when the indexing ID is recorded to part of a diagonal track. If new indexing information is then recorded starting from some position in the fixed length recording time of this indexing ID (for example, at the position 4 sec. from the start of the indexing ID recording period), the existing indexing ID is edited and this new indexing ID is recorded for 9 sec. from that position. As a result of recording this new indexing ID for 9 sec., a continuous indexing ID recording period 13 sec. in duration is effectively recorded to the tape by means of this prior art method. The problem with this method is that it becomes no longer possible to accurately determine the recording start position of the new indexing ID.

It is also possible that when recording a new indexing ID for this 9-sec. period, this fixed length period may overlap the starting position of a previously recorded indexing ID. For example, a previously recorded indexing ID may have been recorded for the standard 9 sec. period starting from a position 4 sec. from the start of a newly recorded indexing ID. Recording this new indexing ID for 9 sec. will likewise result in a continuous indexing ID recording period 13 sec. in duration being recorded to the tape. A similar problem again results: it is not possible to accurately determine the recording start position of the previously recorded indexing ID.

The above two problems become extremely inconvenient when the recording start position of the indexing ID is particularly meaningful (e.g., when the indexing ID identifies a scene or selection change). The starting position of editing operations intended to start from this indexing ID will therefore be offset, and the ID will be effectively rendered useless for precision editing tasks.

SUMMARY OF THE INVENTION

Therefore, the object of the present invention is to provide a recording and reproducing apparatus which provides a subcode area to which indexing information is recorded so that both the recording start position of previously recorded indexing information and the recording start position of newly recorded indexing information can be determined after rewriting the indexing information, regardless of where indexing information was previously recorded.

To achieve this object, according to the present invention, a recording and reproducing apparatus for recording video signal and indexing signal to separate video signal areas and subcode areas, respectively, of diagonal tracks formed on a tape by a rotating head, comprises: tape drive means for driving the tape; add command generator for generating an add command to add said indexing signal; indexing signal control for setting and resetting said indexing signal; recording means for recording the video signal to the video signal area and the indexing signal, if any, to the subcode area of each track; and editing control means for controlling said indexing signal control in response to said add command such that said indexing signal is first recorded as a reset state for a first predetermined amount and then recorded as a set state.

Also, according to the present invention, a recording and reproducing apparatus for recording video signal and indexing signal to separate video signal areas and subcode areas, respectively, of diagonal tracks formed on a tape by a rotating head, comprises: tape drive means for driving the tape; add command generator for generating an add command to add said indexing signal; indexing signal control for setting and resetting said indexing signal; recording means for recording the video signal to the video signal area and the indexing signal, if any, to the subcode area of each track; reproducing means for reproducing a recorded signal from said tape; switching means for switching between a recording mode in which said recording means is connected to said head and a reproducing mode in which said reproducing means is connected to said head; indexing signal detection means for detecting set and reset states of said indexing signal during said reproducing mode; and editing control means for controlling said indexing signal control in response to said add command such that the tape is reproduced for a second predetermined amount to detect any leading edge of previously recorded indexing signal, and if a leading edge of previously recorded indexing signal is detected, said indexing signal is recorded as a set state from a first position where said add command is generated to a second position which is behind said leading edge by said first predetermined amount.

Also, according to the present invention, a recording and reproducing apparatus for recording video signal and indexing signal to separate video signal areas and subcode areas, respectively, of diagonal tracks formed on a tape by a rotating head, comprises: tape drive means for driving the tape; erase command generator for generating an erase command to erase a previously stored indexing signal; indexing signal control for setting and resetting said indexing signal; recording means for recording the video signal to the video signal area and the indexing signal, if any, to the subcode area of each track; reproducing means for reproducing a recorded signal from said tape; switching means for switching between a recording mode in which said recording means is connected to said head and a reproducing mode in which said reproducing means is connected to said head; indexing signal detection means for detecting the indexing signal during said reproducing mode; and editing control means for controlling said indexing signal control in response to said erase command such that the tape is rewound to a third position past a third predetermined amount from a leading edge of said previously stored indexing signal, then the tape is reproduced to detect a fourth position corresponding to a trailing edge of said previously stored indexing signal, then indexing signal is recorded as a reset state from said third position to said fourth position to erase said previously stored indexing signal.

Also, according to the present invention, a recording and reproducing apparatus for recording video signal and indexing signal to separate video signal areas and subcode areas, respectively, of diagonal tracks formed on a tape by a rotating head, said apparatus comprising; tape drive means for driving the tape; erase command generator for generating an erase command to erase a previously stored indexing signal; indexing signal control for setting and resetting said indexing signal; recording means for recording the video signal to the video signal area and the indexing signal, if any, to the subcode area of each track; reproducing means for reproducing a recorded signal from said tape; switching means for switching between a recording mode in which said recording means is connected to said head and a reproducing mode in which said reproducing means is connected to said head; indexing signal detection means for detecting the indexing signal during said reproducing mode; and editing control means for controlling said indexing signal control in response to said erase command such that when the previously stored indexing signal to be erased is preceded by another previously stored indexing signal with an interspace between said two previously stored indexing signal being less than a fourth predetermined amount, said interspace is recorded with set state of said indexing signal to absorb said previously stored indexing signal to said another previously stored indexing signal.

When a recording and reproducing apparatus according to the present invention thus comprised overwrites new information to a previously recorded tape from some midposition in a previously recorded indexing information period of a fixed duration, or when the recording start position of a previously recorded indexing information period of fixed duration is within the fixed duration period to which new indexing information is to be recorded, it is possible to determine the recording start positions both before and after re-writing. As a result, using a recording and reproducing apparatus of the invention, a VCR or other recording and reproducing apparatus with an excellent indexing information edit function can be achieved.

BRIEF DESCRIPTION OF THE DRAWINGS

The present invention will become more fully understood from the detailed description given below and the accompanying diagrams wherein:

FIG. 2 is a diagram showing the placement of rotating heads on the cylinder in the preferred embodiment of the invention, FIGS. 3A and 3B are block diagrams showing the structure of the subcode area in the preferred embodiment of the invention, FIG. 4 is a table showing the content and positions of the ID and data parts of the subcode in the preferred embodiment of the invention, FIG. 5 is a table showing a detail of the content and positions of the subcode recorded to the data part of the subcode in the preferred embodiment of the invention, FIG. 8 is a detailed block diagram of an editing timing generator shown in FIG. 6, FIGS. 9A, 9B, 9C and 9D are timing charts showing the subcode editing timing in the preferred embodiment of the invention, FIGS. 10A and 10B are charts showing the tape movement for recording the indexing ID in two different cases, FIG. 11 is a table showing the content and positions of the ID and data parts of the subcode in the preferred embodiment of the invention, FIGS. 12A and 12B taken together as shown in FIG. 12 show a flow chart for erasing the indexing ID, SRID, and FIGS. 13A and 13B are charts showing the tape movement for erasing the indexing ID in two different cases.

DESCRIPTION OF PREFERRED EMBODIMENTS

Figure 1:
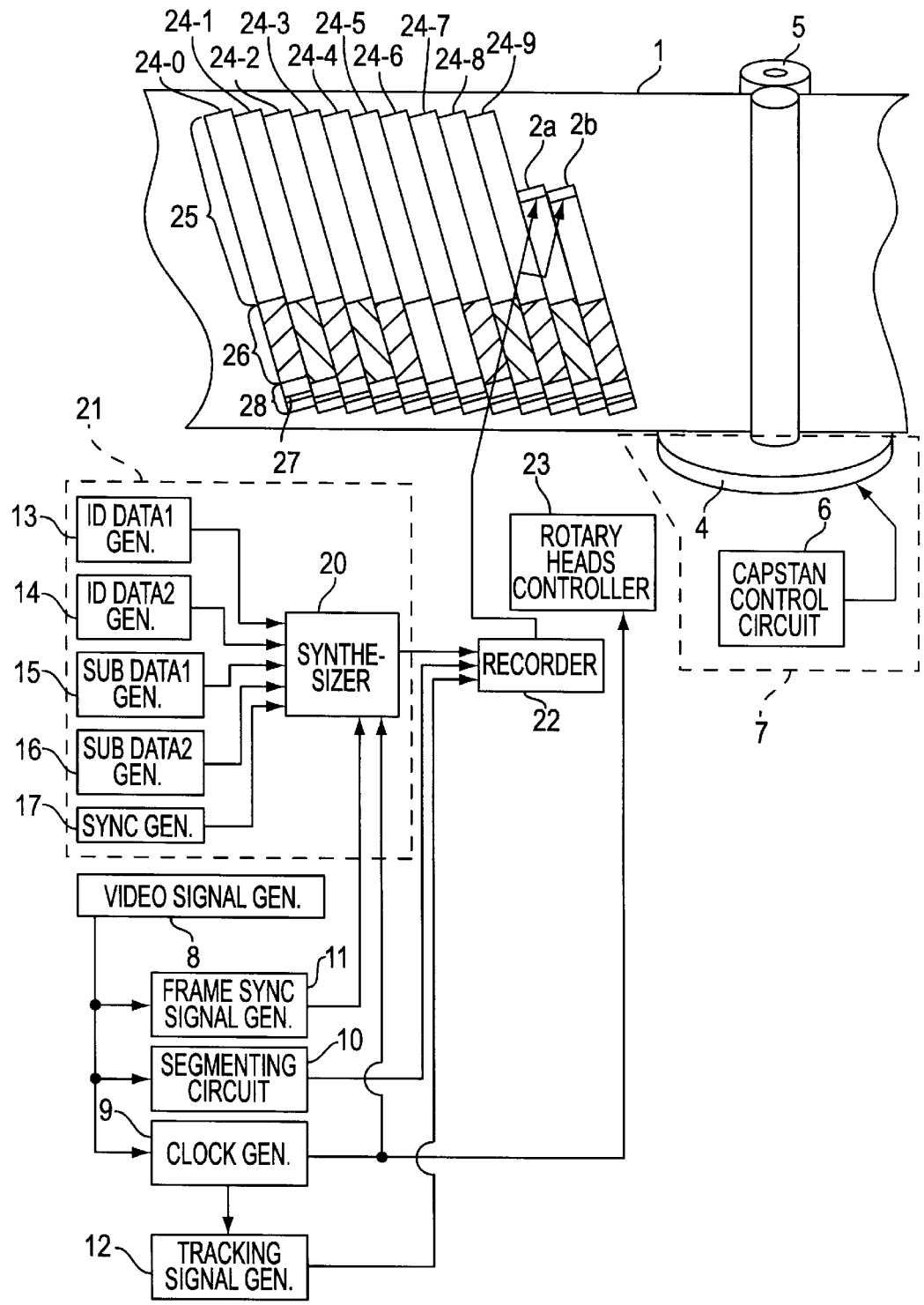
FIG. 1 is a block diagram showing a recording and reproducing apparatus according to the present invention, particularly showing the parts necessary for recording.

The preferred embodiment of a recording and reproducing apparatus according to the present invention is described below with reference to the accompanying figures. FIG. 1 is a block diagram illustrating the recording and reproducing apparatus particularly showing the parts necessary for recording data on a tape.

Referring to FIG. 1, the tracks 24-0 to 24-9 are formed on a magnetic tape 1 by rotating heads 2a and 2b mounted on a cylinder (not shown in the figure).

The tape driver 7 comprises a capstan motor 4, a pinch roller 5, and a capstan control circuit 6. A subcode generator 21 comprises an ID data 1 generator 13, an ID data 2 generator 14, a subdata 1 generator 15, a subdata 2 generator 16, a synchronization signal generator 17, and a synthesizer 20. The recording and reproducing apparatus further comprises a video signal generator 8, a clock generator 9, a segmenting circuit 10, a frame synchronization signal generator 11, a tracking signal generator 12, a recorder 22, and a rotary head controller 23.

Note that in the present embodiment, two rotating heads 2a and 2b are used for recording or reproducing two tracks simultaneously. The locations of the rotating heads on the cylinder 3 in this embodiment are shown in FIG. 2.

A positioning signal area 27 is provided in part of the tracking signal area 28 formed at the beginning of each track on the magnetic tape 1 as shown in FIG. 1. A positioning signal is recorded to this positioning signal area 27. The frequency of this positioning signal is a relatively high frequency so that the positioning signal may have less influence of the crosstalk from adjacent tracks and other signal interference. A pilot signal for tracking is recorded to the tracking signal area 28. This pilot signal is one of two frequencies f1 or f2 recorded to alternating tracks. The frequency of these two pilot signals is a relatively low frequency that is resistant to azimuth loss of the rotating heads 2*a* and 2*b*. The video signal is recorded to the video signal area 25, and the subcode is recorded to the subcode area 26 of each track.

The recording operation of the apparatus shown in FIG. 1 is described next. During recording, the magnetic tape 1 is transported by the pinch roller 5 and the capstan motor 4, the rotational velocity of which is controlled by the capstan control circuit 6.

The video signal generator 8 produces a signal of approximately 30 frames per second (fps), in which one frame constitutes one television screen. The segmenting circuit 10 then divides each frame signal into ten segments so that ultimately the video signal for one frame is recorded to ten tracks, such as to tracks 24-0 through 24-9. The segmented video signal is input to the recorder 22 together with a segment number.

The clock generator 9 generates a clock synchronized to the input video signal. In this case, the video signal is input at 30 fps, and a 150-Hz clock synchronized to the video signal is generated.

The tracking signal generator 12 generates the tracking signal. The tracking signal contains the positioning signal, and the two pilot signals of frequencies f1 and f2 differing according to the clock output by the clock generator 9. This tracking signal is input to the recorder 22.

The frame synchronization signal generator 11 generates a 30-Hz frame synchronization signal synchronized to the frame of the input video signal.

The ID data 1 generator 13 generates ID data 1, which includes the block identification code, indexing ID (hereafter "SRID"), and the program number. ID data 1 is then input to the synthesizer 20.

The indexing ID (SRID) is a code written on, or erased from, the tape according to the user's operation, and is used for quick accessing to the position where the SRID is inserted during the fast forward or rewinding operation. As will be apparent from the further description, the present invention provides new system for recording/erasing the SRID without any error.

The ID data 2 generator 14 generates ID data 2, which includes the block identification code, application ID (hereafter "APID"), and the control ID (hereafter "COID"). ID data 2 is also input to the synthesizer 20.

The subdata 1 generator 15 generates subdata 1 containing the absolute position information (e.g., tape counter or absolute time code). Subdata 1 is also input to the synthesizer 20.

The subdata 2 generator 16 generates subdata 2 containing user information (e.g., recording date and time). Subdata 2 is also input to the synthesizer 20.

The synchronization signal generator 17 generates the synchronization signal. The subcode recorded to the subcode area of each track is recorded to plural (e.g., 12) subareas. These subareas are hereafter referred to as "synchronization blocks" (SB). The synchronization signal is the signal identifying the recording start position of the synchronization block. The synchronization signal is also input to the synthesizer 20.

The synthesizer 20 first recognizes the segment numbers (0–9) in one frame of the segmented video signal input to the recorder 22 based on the clock output from the clock generator 9 and the frame synchronization signal output from the frame synchronization signal generator 11. The combination of ID data and subdata input to the recorder 22 is then switched according to the segment number. More specifically, when the segment number is 0, 1, or 2, a subcode mixing the synchronization signal, ID data 1, and subdata 1 is input; when the segment number is 3 or 4, a subcode mixing the synchronization signal, ID data 2, and subdata 1 is input; when the segment number is 5 or 6, a subcode mixing the synchronization signal, ID data 2, and subdata 2 is input; and when the segment number is 7, 8 or 9, a subcode mixing the synchronization signal, ID data 1, and subdata 2 is input.

Thus, ID data 1 is input to the recorder 22 when the segment number is 0, 1, 2, 7, 8, or 9, but the same data content is input throughout a single frame regardless of the segment number.

ID data 2 is similarly input to the recorder 22 when the segment number is 3, 4, 5 or 6, and the same data content is also input throughout a single frame regardless of the segment number.

Subdata 1 is similarly input to the recorder 22 when the segment number is 0, 1, 2, 3, or 4, and as with ID data 1, the same data content is input throughout a single frame regardless of the segment number.

Subdata 2 is input to the recorder 22 when the segment number is 5, 6, 7, 8, or 9, and the same data content is also input throughout a single frame regardless of the segment number.

As a result, ID data 1, ID data 2, subdata 1, and subdata 2 are each contained in the subcode in four or more consecutive segment numbers.

Based on the clock output of the clock generator 9, the recorder 22 then outputs a recording signal whereby the segmented video signal, subcode, and tracking signal are recorded by the rotating heads 2*a* and 2*b* to respective areas.

The rotary head controller 23 controls the velocity of the cylinder 3 on which the rotating heads 2*a* and 2*b* are mounted synchronized to the clock output of the clock generator 9.

As a result of this operation, tracks as shown in FIG. 1 are formed on the magnetic tape 1. The detailed structure of the subcode area 26 in one track is shown in FIG. 3A, and the detailed structure of one synchronization block of the subcode is shown in FIG. 3B.

As shown in FIG. 3A, the subcode area in one track comprises twelve synchronization blocks (SB0–SB11), and each synchronization block comprises a synchronization part 100, ID part 110, and data part 120 as shown in FIG. 3B.

A two byte signal identifying the recording start position of the synchronization block is recorded to the synchronization part 100. The ID part 110 includes two bytes (ID0 and ID1, one byte each) in ID data 111, and one byte in IDP 112, for a total of three bytes in the ID part 110. The ID data 111 is described in detail later with reference to FIG. 4. A parity signal is recorded as IDP 112. The IDP 112 parity signal is used to detect (and thus correct) signal reading errors from the synchronization part 100 to the ID part 110 in the synchronization block. By recording the IDP 112 to this position in one synchronization block, the ID data 111 recorded as ID0 and ID1 can be read by reading from synchronization part 100 to ID part 110. It is not necessary at this time to read the complete synchronization block (from the synchronization part 100 to the data part 120). This is particularly effective for data reproduction when the scan path of the rotating heads crosses the tape tracks diagonally during, for example, a high speed search.

The data part 120-comprises a five byte subdata block 121 and a two byte data parity block 122. The subdata 121 is described in detail later with reference to FIG. 4. The data parity block 122 is a parity signal. This data parity block 122 is similarly used to detect (and thus correct) signal reading errors from the synchronization part 100 to the data part 120 in the synchronization block. The subdata in the data part 120 can be read when the signal from the synchronization part 100 to the data parity block 122 can be read.

FIG. 4 shows the content and locations of the ID data 111 and the subdata 121 of the subcode. Note that the track numbers (0–9) shown in FIG. 4 coincide with the segment numbers referenced above. Thus, ID data 1 and ID data 2 are switched as the content of the ID data 111, and subdata 1 and subdata 2 are switched as the content of the subdata 121 according to the track number.

ID data 1 is thus recorded as the ID data to track numbers 0, 1, 2, 7, 8, and 9. Although it is recorded in sections to a single frame, ID data 1 is recorded to the ID part of the subcode area to six consecutive tracks if tracks from adjacent frames are also considered. This ID part of adjacent tracks to which the same ID data is recorded is hereafter referred to as the "ID block," and the data part of adjacent tracks to which the same subdata is recorded is hereafter the "subdata block."

The ID part 110 of ID block 1 to which ID data 1 is recorded is described below in the head scanning order, i.e., the order the data is recorded to tape. As mentioned above, the ID data 111 comprises two bytes, ID0 and ID1. A total nine bits is recorded to ID0 in the following sequence: a 4-bit synchronization block number 113, a 2-bit block identification code 114, a 1-bit SRID 115, and the first bit of the nine bit program number 116 (PN2–PN0). The remaining eight bits of the program number 116 are recorded to ID1 in ID data 1.

The synchronization block number 113 identifies which synchronization block 0–11 in the subcode area 26 is recorded to the one track. The block ID code 114 distinguishes the four possible block combinations that can be made in one frame from ID data 1 and 2 and subdata 1 and 2 as shown in FIG. 4. The same ID and program number are recorded as the SRID 115 and program number 116 (PN2–PN0), respectively, in one frame.

The block ID code 114 of track numbers 0, 1, and 2 is b"00" in which the prefix b indicates the binary expression, and the block ID code 114 of track numbers 7, 8, and 9 is b"11". The synchronization block number 113 ranges from 0–11.

ID data 2 is recorded as the ID data 111 of the ID part 110 in track numbers 3, 4, 5, and 6 (ID block 2). Described below in the head scanning order, a 4-bit synchronization block number 113 and 2-bit block ID code 114, each with the same meaning as in ID data 1, are recorded first. The next two bits 117 are b"00." A 2-bit APID 118 and 6-bit COID 119 are then recorded. The APID 118 is identification information indicating the type of data recorded to the ID part 110 and the data part 120. Recording the APID signal makes it possible to change the data content recorded to the data part and the ID part. The COID may also contain ID information for skip-search operations, or table of contents (TOC) ID data.

The TOC can be read to create a menu of the video signal content recorded to the tape, and the TOC ID indicates whether a TOC is recorded to that period. Note that the TOC is normally recorded together with the video signal to the video signal recording area. Note, also, that the APID 118 and COID 119 ID data remain constant throughout one frame. The block ID code 114 b"01" is recorded to track numbers 3 and 4, and b"10" is recorded to track numbers 5 and 6. The synchronization block number 113 ranges from 0–11.

The subdata 121 recorded to the data part 120 is described next. The absolute position information (subdata 1) is recorded as the subdata (subdata block 1) of the data part 120 in track numbers 0–4. User information (subdata 2) is recorded as the subdata (subdata block 2) of the data part 120 in track numbers 5–9. The detailed positioning of the subdata 121 is shown in FIG. 5. Only the subdata 121 of the data part 120 recorded to the synchronization block of the subcode area 26 is shown in FIG. 5. The absolute time code (ATC 123) and tape counter (TC 124) are recorded to alternating synchronization blocks as the absolute position information in tracks 0–4. The recording date (T1 125) and recording time (T2 126) are similarly recorded to alternating synchronization blocks in tracks 5–9. Note that ATC 123, TC 124, T1 125, and T2 126 are recorded together with an ITEM identification header as required so that the data content can be discriminated using the identification header as may be required during data reproduction.

By thus simultaneously recording a subcode together with the video signal, tape contents can be more efficiently located and manipulated during edit and search operations.

The subcode area 26 of each track is divided into plural (twelve in this embodiment) synchronization blocks, and a block ID code 114 is included in the ID data 111 of the ID part 110 of the subcode area 26 in all tracks in this embodiment. By thus recording a block ID code 114 to all synchronization blocks, the data content of each synchronization block can be read during cross-track search operations in which the subcode synchronization blocks are reproduced and detected, and high speed subcode searches are possible.

Note that by recording the APID 118 to ID data block 2, this ID can be read during searching operation to determine the subcode data position. This is useful when the meaning of the control ID (COID) is changed according to the APID when the user information content and position are changed according to the APID.

Both the block ID code 114 and APID 118 are recorded to the ID part 110 of the synchronization block. The detection rate of data recorded to the ID part 110 is greater than that of data recorded to the data part 120 during high speed searches. As described above, the reproduction period required to read data recorded to the ID part 110 can be shorter than that of data recorded to the data part 120. As a result, the detection rate during high speed searches increases during cross-track playback operations.

By structuring the tracks as described above, ID data 1, ID data 2, subdata 1, and subdata 2 can be edited independently. This means that during editing operations in which ID data 1. is re-written, for example, ID data 2, subdata 1, and subdata 2 can be preserved, and the same is true when editing ID data 2, subdata 1, or subdata 2. The user can be provided significantly enhanced freedom of use using a function such as this in a VCR.

Note also that while the indexing ID and program number are recorded as ID data 1, search operations for locating a particular scene can be made much more effective if the indexing ID can be freely inserted after the program content is recorded. Even in such cases, however, it is necessary to preserve the other subcode data (APID, COID, absolute position information, and/or user information). In other words, being able to discretely edit the subcode is an extremely meaningful function.

Figure 6:
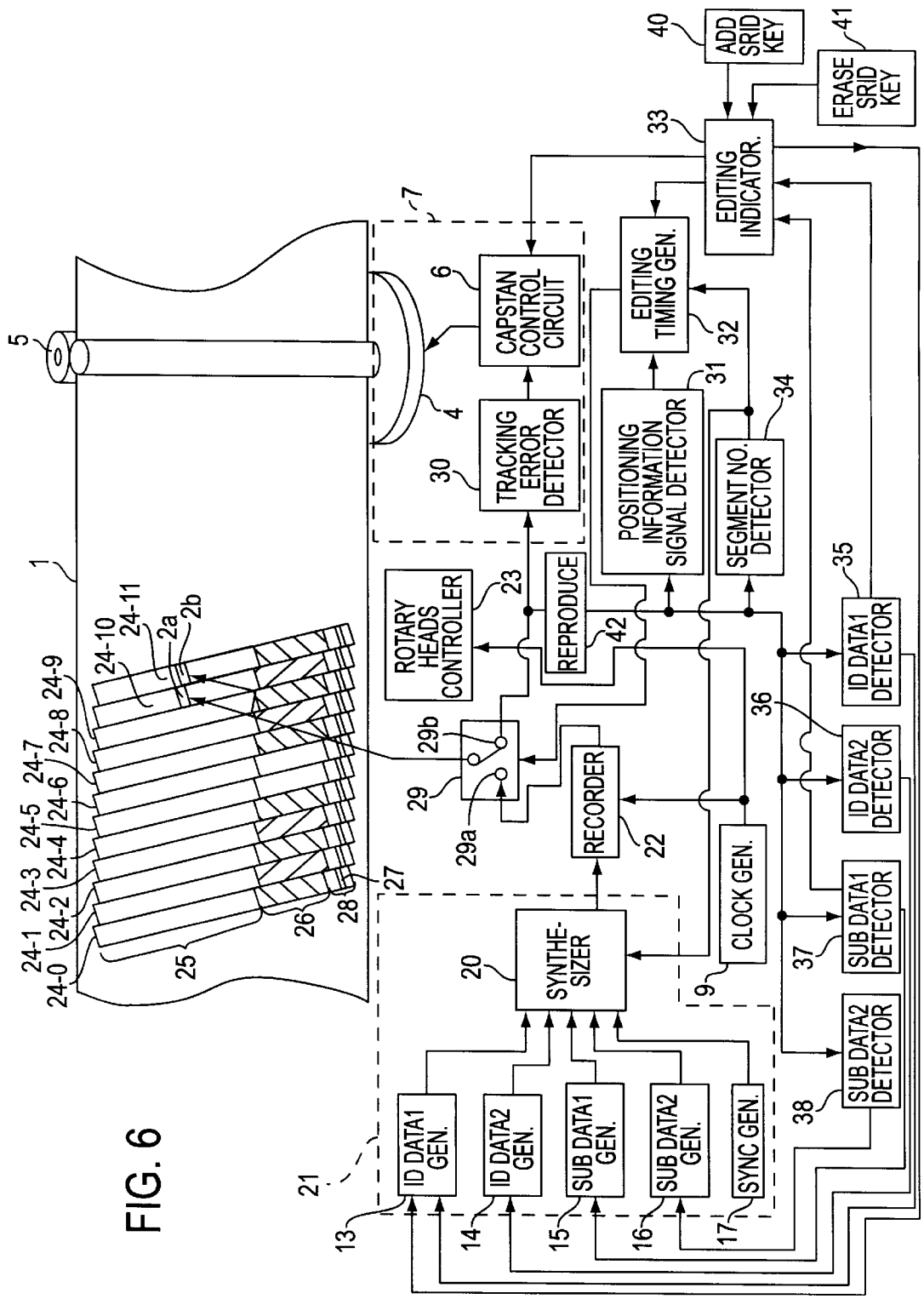
FIG. 6 is a block diagram of a recording and reproducing apparatus according to the present invention, particularly showing the parts necessary for re-writing the indexing ID, SRID, FIGS. 7A and 7B taken together as shown in FIG. 7 show a flow chart for recording the indexing ID, SRID.

Referring to FIG. 6, a block diagram of a recording and reproducing apparatus according to the present invention is shown, particularly showing the parts necessary for re-writing the indexing ID, SRID. Also shown in FIG. 6 are an edit position selector switch 29, reproducer 42, tracking error detector 30, positioning information signal detector 31, editing timing generator 32, editing indicator 33, segment number detector 34, ID data 1 detector 35, ID data 2 detector 36, subdata 1 detector 37, subdata 2 detector 38, add SRID key 40, and erase SRID key 41. It is needless to say that the elements 8, 10, 11 and 12 shown in FIG. 1 are equipped in the apparatus shown in FIG. 6.

It is assumed in the following description that the indexing ID (SRID) set signal is recorded for a fixed period of five seconds (150 frames) on tape. In general, the program number will not change during the SRID set signal recording period, and if the program number of the SRID re-write period is known, no problems will be caused by simultaneously re-writing the SRID and program number.

Figure 7B:
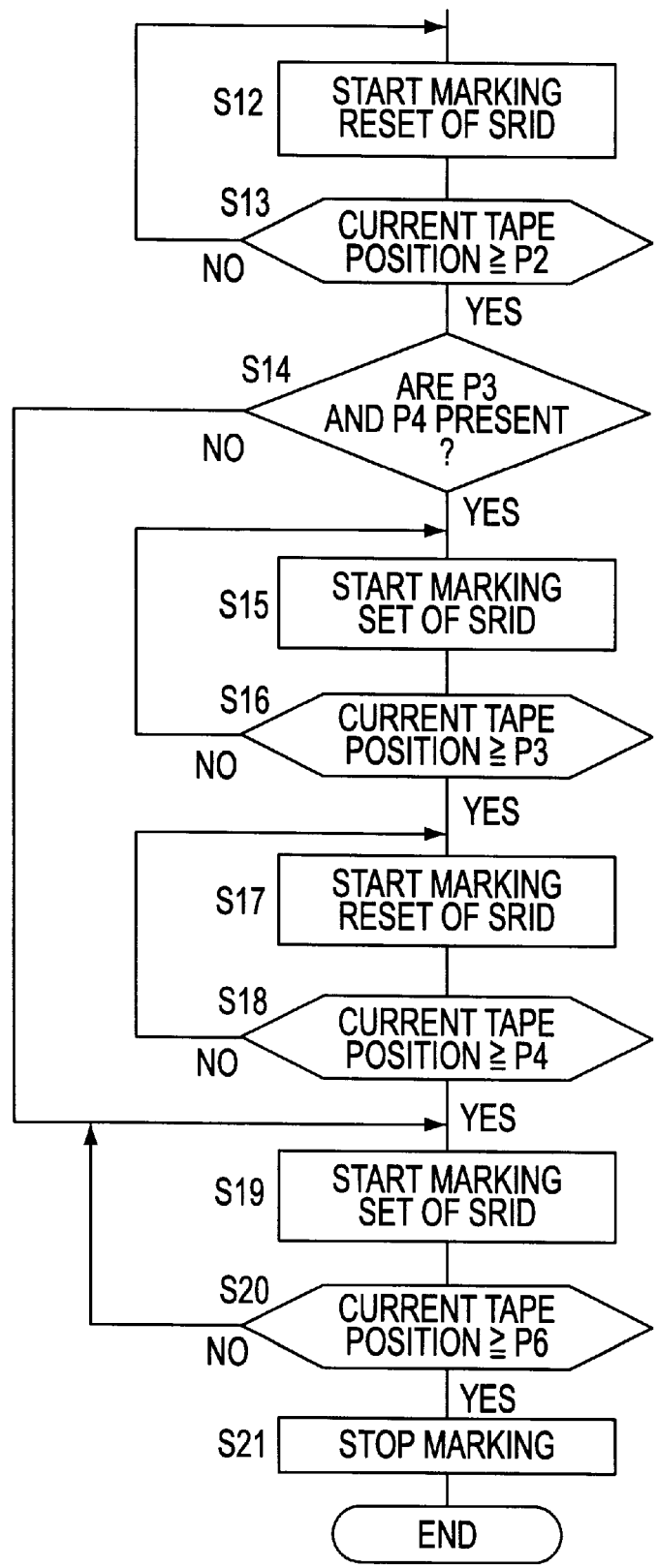

The editing indicator 33 is formed preferably by a microcomputer, and is programmed to carry out the operation shown in FIGS. 7A and 7B for inserting a new SRID. The SRID write-in operation will be described below in connection with FIGS. 7A, 7B, 10A and 10B. FIG. 10A shows a case when the leading edge of the previously recorded SRID marking exists within a first predetermined advanced distance ΔD1 from a position where the user intended to insert a new SRID marking, and FIG. 10B shows a case when the leading edge of the previously recorded SRID marking does not exist in such a predetermined advanced distance ΔD1.

At step S1, it is detected whether or not an add SRID command is produced by the depression of the add SRID key 40. When the add SRID command is detected, the program goes to step S2 at which the present tape position is detected and stored as data P2. At step S3, a predetermined tape advanced position P6 is calculated by adding P2 with a first predetermined amount ΔD1, a first predetermined tape retreated position P5 is calculated by subtracting second predetermined amount ΔD2 from P2, and a second predetermined tape retreated position P1 is calculated by subtracting third predetermined amount ΔD3 from P2. According to the preferred embodiment ΔD1>ΔD2 and ΔD2=2ΔD3. These positions are shown in each of FIGS. 10A and 10B.

At step S4, normal replay starts from the position P2 up to the position P6 (step S7). During this normal replay, it is detected at step S5 whether any leading edge of previously added SRID is present or not. If such a leading edge is detected, the position of the leading edge of the old SRID is stored as data P4, and at the same time, a predetermined tape retreated position P3 from the leading edge is calculated by subtracting the third predetermined amount ΔD3 from P4 (step S6). Positions P4 and P3 are shown only in FIG. 10A.

At step S7, the current tape position is detected and is compared with the position P6. If the current tape position reaches the position P6, the tape stops and is rewound (step S8) until the tape is returned back to position P5 (step S9). When the tape is returned back to position P5, the normal replay starts (S10). During the normal replay and when the tape is advanced to the position P1 (step S11), reset data, such as "0", of SRID is marked on the tape. Such a reset of SRID marking continues until the tape moves to the position P2 (step S13). When the tape is advanced to the position P2, it is first detected whether the positions P3 and P4 are recorded or not (step S14). FIG. 10A shows a case when positions P3 and PS are recorded, and FIG. 10B shows a case when-positions P3 and P5 are not recorded.

If the positions P3 and PS are not recorded, the operation advances to step S19 for start writing a new set data, such as "1", of SRID marking up to the position P6 (step S20).

If the positions P3 and PS are recorded, the operation goes to step S15 to start writing a new set data "1" of SRID marking only up to the position P3 (step S16). After the position P3, new reset data "0" of SRID is marked (step S17) up to the position P4 (step S18). Then, from the position P4, another new set data "1" of SRID marking starts up to the position P6 (steps S19 and S20). Thereafter the marking stops (step S21) se that the previously written marking continues thereafter.

As apparent from FIG. 10A, in the case where the leading edge of the previously recorded SRID marking "1" exists within the first predetermined advanced distance ΔD1 from a position where the user intended to insert a new SRID marking, the old and new SRID markings "1" are separately added by: inserting a reset SRID marking "0" between positions P3 and P4.

From FIG. 10B, in the case where the leading edge of the previously recorded SRID marking does not exist in such a predetermined advanced distance ΔD1, the new SRID marking "1" starts from the intended position P2 for a predetermined required tape distance ΔD1 with a reset SRID marking "0" inserted for a tape distance ΔD3 immediately before the leading edge of the newly added SRID marking "1" so that the newly added SRID marking "1" can be distinguished from the old SRID marking "1", if the new marking should start from a middle of the old SRID marking "1".

The operation shown in FIG. 10A is further analyzed in detail below. In FIG. 10A, it is here assumed that an SRID set marking was previously recorded for the fixed period L4 (corresponding to 150 frames) starting from position P4; a new indexing ID is to be recorded from a position P2 located before P4 in the direction of tape travel, and a new SRID set marking is to be recorded to enable accessing to position P2. Period (L2+L3+L5=ΔD1) starting from position P2 is equivalent to the 150 frame set signal period, and this period (L2+L3+L5) overlaps the recording starting position P4 of the previously recorded SRID set marking. The method of writing the new SRID set marking is described below.

The operation is outlined first.
(1) The period (L2+L3+L5=ΔD1) starting from position P2 is first replayed to detect the presence of any leading edge of previously recorded SRID set marking within that period.

It is assumed in this example that a leading edge of a previously recorded SRID set marking is detected within the period (L2+L3+L5=ΔD1).
(2) The tape is then rewound. The rewind distance is determined to satisfy the following conditions.

1. Rewind end position P5 is set at a position on the tape before the position P1 (the SRID reset signal recording start position, described in detail below) in the normal tape winding direction with sufficient distance ΔD3 between rewind end position P5 and position P1 (a) for tracking to be completed during tape travel from P5 to P1, and (b) for at least one frame of data recorded to the subcode area to be reproduced.

2. This distance ΔD3 from P5 to P1 must also be as short as possible because the time required for the edit operation increases the longer rewinding takes.

(3) The tape is then reproduced to detect data from the subcode area required to rewrite the SRID.

(4) An SRID reset signal is recorded to period L1, preferably equal to ΔD3, starting from position P1.

Period L1 is equivalent to 10 frames, i.e., position P1 is located 10 frames before position P2 (a position near to where tape winding starts).

(5) The SRID set signal is then recorded for the period L2 starting from position P2. Period L2 is the period starting from position P2 and ending at position P3, and position P3 is at a position period L3 (10 frames) before position P4 (the recording start position of the previously recorded SRID set signal).

(6) An SRID reset signal is recorded for period L3 starting from position P3.

(7) The SRID set signal is recorded for a period L5 starting from position P4.

The length of period L5 is equivalent to the fixed period length (150 frames) minus the length of periods (L2+L3). The length of periods (L2+L3) is equivalent to the length on tape from position P2 (the recording start position of the new SRID set signal) to position P4 (the recording start position of the previously recorded SRID set signal).

Thus, when the indexing ID is re-written for a fixed period equivalent to 150 frames starting from position P2, it is first determined whether a recording start position for a previously recorded SRID set signal is located within that fixed period from the starting position of the new set signal. When such a position is detected, as it is assumed to be in this example, a reset signal is first recorded for a period L1 from position P1, the SRID is recorded for a fixed period to P3, a reset signal is recorded for period L3 from P3, and the SRID set signal is recorded for period L5.

The operation outlined in steps (1)–(5) above is described in detail below.

(1) Detecting an SRID Set Signal Recording Start Position

The overall operation of the recording and reproducing apparatus is described first (see FIG. 6).

It is assumed that the editing indicator 33 recognizes that a new SRID set signal is to be recorded from position P2 based on an external input. The editing indicator 33 thus instructs the edit position selector switch 29 to contact pole 29b. The clock generator 9 produces a 150-Hz signal, and the rotary head controller 23 controls the velocity of the cylinder 3 on which the rotating heads 2a and 2b are mounted synchronized to the clock output of the clock generator 9. A reproduce (read) signal is output from rotating head 2a because the edit position selector switch 29 is switched to pole 29b. Tracking control is also applied based on this output signal. The capstan control circuit 6 is also instructed to execute tracking control by the editing indicator 33.

The tracking method is described below.

As described above, pilot signals of two different frequencies f1 and f2 every other track are recorded frequency multiplexed to the tracking signal area 28 of the recorded tracks. The tracks are recorded in sequence from track 24-0 as f0, f1, f2, f0, f1 . . . . The pilot signal is not recorded to f0 tracks. The pilot signal of frequency f1 is recorded frequency multiplexed to the f1 tracks. The pilot signal of frequency f2 is recorded frequency multiplexed to the f2 tracks.

Tracking is controlled so that rotating head 2a always scans the f0 tracks. For example, as shown in FIG. 6, rotating head 2a is controlled to track 24-10. When rotating head 2a scans the tracking signal area 28 of track 24-10, the leakage component of the different pilot signal components f1 and f2 recorded to the adjacent tracks 24-9 and 24-11 are also detected. The tracking error information is detected from these signals by the tracking error detector 30, and the capstan control circuit 6 controls the capstan motor based on the tracking error information input thereto.

The tracking error detector 30 is a common detector that operates by comparing the size of the f1 and f2 components and outputting the tracking error information proportionally to the detected difference. The tracking error information always outputs the difference of the pilot component contained in the leading track minus the pilot component contained in the trailing track. For example, when the rotating head 2a scans track 24-10, a value proportional to the difference of the pilot component contained in the tracking signal area of track 24-9 subtracted from the pilot component contained in the tracking signal area of track 24-11 is output. The tracking of rotating head 2b to track 24-11 can be simultaneously maintained by tracking rotating head 2a to track 24-10 because rotating head 2b is positioned extremely close to rotating head 2a and the relative position of rotating head 2b to rotating head 2a can be assured.

By thus tracking the rotating heads 2a and 2b to the tape tracks, the signal reproduced by rotating head 2a is input to the ID data 1 detector 35. The tape is driven in a reproducing mode for a 150-frame-equivalent period from position P2 to detect whether a set or reset signal is recorded as the SRID. The SRID set signal recording start position P4 is thus detected, and the tape position is stored by detecting the absolute position information recorded as subdata 1. The position P3 is then calculated from the absolute position information of position P4. The absolute position information is thus used as the positioning information of the rewrite edit operation. It is thus possible to calculate position Pi from position P2.

It is also possible to determine the end position of the 150-frame-equivalent period from position P2 from the absolute position information (detected by the ID data 1 detector 35), and to execute step (2) when that tape position is reached.

(2) Tape Rewind Operation

The editing indicator 33 instructs the capstan control circuit 6 to rewind the tape. In general, the tape can be rewound at a faster tape speed than that of the recording and reproducing operations. Tracking control is not required for the rewind operation. It is assumed here that the rewind tape speed is 3-times the recording speed (i.e., −3×). The information from the subcode area is reproduced from tape while rewinding, enabling the absolute position information to be detected by the subdata 1 detector 37 and the tape to be stopped after being rewound the preset extra amount from the absolute position of position P1. As described above, this extra amount from P1 is equivalent to ten frames, and is shown as position P5 in FIG. 10A.

(3) Tape Reproducing

Tracking is controlled as described in (1) above while advancing the tape in the reproducing mode. The read signal from rotating head 2a is input to the ID data 1 detector 35. The ID data 1 generator 13 produces the same program number as the program number detected by the ID data 1 detector 35.

(4) SRID Reset Recording 1

When the tape is advanced in the reproducing mode to position P1, ID data 1 is written to the tape as controlled by the editing indicator 33. Note that position P1 is determined from the absolute position information detected by the subdata 1 detector 37 from the reproduced signal. The SRID reset signal of ID data 1 is recorded in period L1.

During the ID data 1 writing operation, the edit position selector switch 29 switches at the timing described below between a mode recording the recording signal generated by the recorder 22 and a mode reproducing the signals from the rotating heads 2a and 2b. Specifically, the recording signal record mode is selected when the subcode area of the tracks to which ID data 1 is recorded are scanned, and the mode reproducing the signals from the rotating heads 2a and 2b is selected when all other areas are scanned.

As instructed by the editing indicator 33, the ID data 1 generator 13 generates new ID data 1. The program number of this new ID data 1 is written to retain the program number by the ID data 1 detector 35 before the rewrite operation began. A predetermined block identification code is also produced as the block identification code. An SRID reset signal is also produced. The resulting ID data 1 is input to the synthesizer 20.

Note that when rewriting the ID data 1, a new signal is recorded only when the head scans the subcode area of tracks 0, 1, 2, 7, 8, and 9. When the head scans the subcode area of tracks 3–6, the recorder/reproducer is in the reproducing mode, and data is therefore read. When rewriting the ID data 1 of the ID part of the synchronization blocks in the subcode areas recorded to tracks 0, 1, and 2, it is necessary to simultaneously rewrite the subdata 1 (absolute position information) recorded to the data part of the same synchronization blocks. It is also essential to retain the previously recorded data in subdata 1. The same subdata 1 is therefore recorded to tracks 3 and 4 in addition to tracks 0, 1, and 2. The subdata 1 recorded to tracks 0, 1, and 2 can thus be produced by a one frame equivalent conversion from the subdata 1 obtained by reproducing tracks 3 and 4 in the previous frame.

When rewriting the ID data 1 recorded to tracks 7, 8, and 9, it is necessary to simultaneously rewrite the subdata 2 (user information )recorded to the data part of the same synchronization blocks. It is also essential to retain the previously recorded data in subdata 2. The same subdata 2 is therefore recorded to tracks 5 and 6 in addition to tracks 7, 8, and 9. The subdata 2 recorded to tracks 7, 8, and 9 is the same as the subdata 2 obtained by reproducing tracks 5 and 6 of the same frame, and can thus be created.

The new subdata 1 is generated by the subdata 1 detector 37 and subdata I generator 15. The new subdata 2 is generated by the subdata 2 detector 38 and the subdata 2 generator 16. Subdata 1 and subdata 2 are then input to the synthesizer 20.

ID data 2 is not re-written here, and creation of ID data 2 (APID, COID) is therefore not described in detail.

The synthesizer 20 synthesizes the synchronization signal and either ID data 1 or 2 and either subdata 1 or 2 according to the segment number detected by the segment number detector 34.

The segment number detector 34 is able to detect the segment number (the track number of the one frame) contained in the video signal of the video signal area 25 by demodulating the signal reproduced by the rotating heads 2a and 2b. For example, the segment number of track 24-1 in FIG. 6 is 0. Because the detected segment number is the segment number from the preceding scan and two channels are simultaneously recorded, the segment numbers of the track currently being scanned and the track previously scanned by the same head will differ only by two.

Thus, if, as determined from the segment number of the previous scan detected by the segment number detector 34, the segment number of the track currently being scanned is 0, 1, or 2, the synthesizer 20 synthesizes and outputs the synchronization signal, ID data 1, and subdata 1. Likewise, if the segment number of the track currently being scanned is 3 or 4, the synchronization signal, ID data 2, and subdata 1 are synthesized and output. If the segment number of the track currently being scanned is 5 or 6, the synchronization signal, ID data 2, and subdata 2 are synthesized and output. If the segment number of the track currently being scanned is 7, 8, or 9, the synchronization signal, ID data 1, and subdata 2 are synthesized and output.

The signal output from the synthesizer 20 is then input to the recorder 22. The recorder 22 outputs a record signal, whereby the subcode is recorded to the subcode area, to the edit position selector switch 29 according to the clock output of the clock generator 9, the control standard for the rotating heads 2a and 2b. This operation creates the recording current.

The operation subsequent to this is described using FIGS. 8 and 9A–9D. FIG. 8 is a block diagram of the editing timing generator 32, and FIGS. 9A–9D show a timing chart used to describe the method of determining the subcode editing timing.

The editing indicator 33 outputs a signal instructing an ID data 1 re-write. More specifically, the editing indicator 33 inputs to the editing timing generator 32 a signal instructing that the subcode area be re-written when the segment number is 0, 1, 2, 7, 8, or 9. This instruction signal is output for a period equivalent to (150+10) frames (the period L1+L2+L3+L5) in FIG. 10A, i.e., during the operation described in steps (4) through (7).

While the edit position selector switch 29 is switched to pole 29b, the signal from the rotating head 2a is separately input to the positioning information signal detector 31. The positioning information signal detector 31 detects the positioning information signal recorded to the positioning signal area 27 in one part of the tracking signal area of the scanned track, and generates the pulse signal expressing the position of the positioning signal as shown in FIG. 9B. This pulse signal is input to the editing timing generator 32.

The segment number detector 34 detects the segment number (the track number of the frame) contained in the video signal of the video signal area 25 by demodulating the reproduced signal. The detected segment number is input to the editing timing generator 32.

When rewriting the subcode area of a specific track in one frame, it is necessary to specify the track (segment) number being rewritten, and the starting and end positions in that track. The editing timing generator 32 generates the timing signal at which the edit position selector switch 29 switches between poles 29a and 29b based on the output signal from the editing indicator 33, the pulse signal output by the positioning information signal detector 31, and the segment number output from the segment number detector 34.

The operation of the editing timing generator 32 is described in detail next.

The output signals from the editing indicator 33 and the segment number detector 34 are input to the comparative operator 32a of the editing timing generator 32. Based on the output from the segment number detector 34, the comparative operator 32a detects the track number of the next track to be scanned. The comparative operator 32a sets the output signal INS_TR to HIGH if this track number matches the track number input from the editing indicator 33, and otherwise sets the output signal INS_TR to LOW. Because the segment number detector 34 detects the segment number contained in the video signal recorded to the video signal area 25 at this time, the segment number stored while the rotating head 2a scans the subcode area 26 or the tracking signal area 28 is the segment number of the previous scan.

The pulse signal output from the positioning information signal detector 31 is input to the first and second delay circuits 32b and 32c. Each delay circuit then begins counting the internal fixed clock of the recording and reproducing apparatus shown in FIG. 9A, and creates a delay signal by counting this internal clock for a period equivalent to the specified delay times t1 and t2. The subcode editing timing signal shown in FIG. 9C is then generated by inputting these delay signals to the R-S flip-flop 32d as shown in FIG. 8. The subcode editing timing signal is input with the INS_TR output signal of the comparative operator 32a to AND circuit 32e, and the output of this AND operation is input to the edit position selector switch 29 as the ID data 1 editing timing signal.

The edit position selector switch 29 switches from pole 29b to pole 29a only when the ID data 1 editing timing signal thus generated is HIGH, causing a new record signal to be applied to the rotating head 2a and a new ID data 1 to be overwritten to the subcode area of the tracks to which ID data 1 is recorded. Note that this operation continues until position P2 is reached.

(5) SRID Set Recording 1

When position P2 is reached in step (4) above, a set signal is recorded as the SRID of ID data 1 according to the instructions from the editing indicator 33. Note, again, that position P2 is determined from the absolute position information detected by the subdata 1 detector 37 from the signal reproduced from tracks 3 and 4. This operation differs from that in (4) above in that a set signal is generated in place of a reset signal as the SRID by the ID data 1 generator 13. The rest of the operation is the same as that described above, and redundant description is therefore omitted.

(6) SRID Reset Recording 2

When position P3 is reached in step (5) above, a reset signal is recorded as the SRID of ID data 1 as instructed by the editing indicator 33. Note that position P3 is determined from the absolute position information detected by the subdata 1 detector 37 from the signal reproduced from tracks 3 and 4. This operation is, in principle, the same as that in (4) above, and continues until position P4 is reached.

(7) SRID Set Recording 2

When position P4 is reached in step (6) above, a set signal is recorded as the SRID of ID data 1 according to the instructions from the editing indicator 33. Note that position P4 is determined from the absolute position information detected by the subdata 1 detector 37 from the signal reproduced from tracks 3 and 4. This operation is the same as that in (5) above, and continues through period L5. Tape travel is then stopped and the re-write edit operation is completed.

By creating the recording current and determining the re-write timing by the above method, insertion edit operations whereby, for example, ID data 1 is re-written while preserving the content and integrity of ID data 1 and subdata 1 and 2 are made possible. This operation results in the indexing ID (SRID) as shown at the bottom of FIG. 10A.

If the SRID is rewritten as described above, it will always be possible to detect or discriminate the recording start position of a previously recorded SRID set signal and the recording start position of the newly recorded SRID set signal. More specifically, it is possible determine the recording start position of a newly recorded SRID set signal when an SRID establishing a new indexing position is recorded in the middle of a previously recorded indexing period. When the newly recorded SRID set signal period overlaps the starting position of a previously recorded SRID set signal recording period, it also remains possible to determine the starting position of the previously recorded set signal period. In other words, all indexing information is retained even after recording a new indexing ID set signal because the SRID signal always changes from the SRID set signal level to a reset signal level between SRID periods.

The case shown in FIG. 10B is described next. As shown in FIG. 10B, it is assumed that an SRID set signal has been previously recorded for period L11 (equivalent to 150 frames) starting at position P11, and a new SRID set signal is to be recorded to enable indexing to position P2 in period L11. Note that the new SRID set signal is to be recorded for the standard fixed length period of 150 frames (period L13 in FIG. 10B), and that there are no recording start positions for other previously recorded SRID set signal periods within period L13. The SRID rewrite operation for this case is described below.

(11) The period L13 starting from position P2 is reproduced to detect the presence of any SRID set signal recording start positions within that period. It is assumed in the following description that there are no SRID set signal recording start positions within period L13. The case in which an SRID set signal recording start position is detected within the new SRID recording period is described above with reference to FIG. 10A.

(12) The tape is then rewound after reproducing period L13. The rewind distance is determined to satisfy the following conditions.

1. Rewind end position P5 is set at a position on the tape before the position P1 (the new SRID recording start position, described in detail below) in the normal tape winding direction with sufficient distance between rewind end position P5 and position P1 (a) for tracking to be completed during tape travel from P5 to P1, and (b) for at least one frame of data recorded to the subcode area to be reproduced.

2. This distance from P5 to P1 must also be as short as possible because the time required for the edit operation increases the longer rewinding takes.

(13) The period from position P5 to position P1 is then reproduced to detect the data of the subcode area required to rewrite the SRID.

(14) An SRID reset signal is recorded to period L12 starting from position P1.

Period L12 is equivalent to 10 frames, i.e., position P1 is located 10 frames before position P2.

(15) The SRID set signal is then recorded for the fixed period L13 starting from position P2. Note that period L13 is equivalent to 150 frames.

An indexing ID (SRID) as shown in FIG. 10B is recorded to tape as a result of this operation. Note that, as described with FIG. 10A above, ID data 1 and subdata 1 and 2 are preserved because the same operating principle is applied.

If the SRID is rewritten as-described above, it will always be possible to detect or discriminate the recording start position of a previously recorded SRID set signal and the recording start position of the newly recorded SRID set signal. Specifically, the SRID signal level always changes from the reset signal level to the set signal level of the indexing ID period at the SRID recording start position, and it is therefore possible to find the SRID recording start positions by searching for these positions where the signal level changes.

FIG. 11 shows another example of the content and positioning of the ID data 111 and subdata 121 of the subcode. In this case the ID data is the same in all tracks of a single frame. Subdata recording is the same as described above with reference to FIG. 4, and further description is therefore omitted.

The ID data 111 of this embodiment in described next in the head scanning sequence. A 4-bit synchronization block number 113 is first recorded; this is the same as in FIG. 4. A 2-bit block ID code 114 is then recorded. In this case there is only one ID data block but two subdata blocks, and there are therefore two possible combinations of ID data blocks and subdata blocks. This means that it is sufficient if the block-ID code 114 can distinguish between blocks to which subdata 1 is recorded (subdata block 1) and blocks to which subdata 2 is recorded (subdata block 2). Therefore, b"00" is recorded as the block identification code to tracks 0–4 to which subdata 1 is recorded, and b"10" is recorded as the block identification code to tracks 5–9 to which subdata 2 is recorded. A 1-bit SRID 115 and 1-bit PHID 131 are then recorded. The SRID 115 is the indexing ID as described above. The PHID 131 is an ID code for searching for periods to which a desired image is recorded.

The SRID set signal is recorded to the recording start position of a recorded program, and the PHID 131 is recorded as a set bit during the period of the program to which an image (motion or still) that is to be searchable is recorded. A 4-bit APID 118 and a 4-bit program number (PN0) 132 are then recorded. It is further assumed in this embodiment that the SRID and PHID will not be simultaneously set. It is possible in this case to record the program number as the PN0 132 in those periods in which the SRID is set, and to record a number corresponding to the recorded image data as the PN0 132 in those periods in which the PHID is recorded set. This configuration can provide a superior search function capability in VCR devices. In other words, this configuration makes it possible to search for the SRID while confirming the program number, or to search for a PHID while confirming the image data number. That the subcode area can be used more efficiently with this configuration than when the image data number and program number are recorded to separate areas will be obvious.

Next, the operation for rewriting the SRID or PHID in ID data recorded as shown in FIG. 11 is described next. The PHID rewrite operation is described below. When the PHID (or SRID) is rewritten in this embodiment, the subcode area of all tracks in the corresponding period is rewritten. It is necessary, however, to retain the data content written to all parts other than the PHID bit. The overall timing of the operation is as described in the previous embodiment. In other words, when recording a new PHID set bit to a previously recorded tape, the operation described in steps (1)–(7) and in steps (11)–(15) is the same as that with the data structure shown in FIG. 4. These operations differ, however, in the method of generating the SRID, APID, and PNO contained in the ID data, and the new subdata 1 and subdata 2, in (4)–(7) and (14), (15).

As described above in the previous embodiment using the data structure in FIG. 4, the mode driving the tape in a data read state ((3) or (13)) changes to a mode rewriting the subcode area ((4)–(7) or (14), (15)) at a specific timing during the rewrite editing operation. The new subdata 1 in this embodiment is generated by incrementing the subdata 1 (absolute position information) detected by the subdata 1 detector 37 during tape travel in the reproducing mode from the moment the rewrite mode is selected (the moment subdata input from the subdata 1 detector 37 stops). Subdata 2 (user data) is similarly created by the subdata 2 detector 38 and subdata 2 generator 16.

The SRID is the same SRID data detected by the ID data 1 detector 35 during tape travel in the reproducing mode. If an SRID is set in this period, it will be recorded for a period longer than the predetermined specified period, but this poses no practical problems.

Likewise, the APID is the same APID data detected by the ID data 1 detector 35 during tape travel in the reproducing mode. Because of the nature of the APID data, creating the APID data in this way completely preserves the previously recorded information.

A number corresponding to the newly recorded PHID is recorded for the PN0. In this embodiment, the desired number is generated by the ID data 1 generator 13.

A number corresponding to the subdata (subdata 1 or 2) recorded to that track is generated as the block identification code.

All data other than the PHID data is thus created in the PHID rewrite period (both the PHID set and reset signal level periods).

The operation is, in principle, the same when rewriting the SRID. The new PHID in this case is the same as the PHID data detected by the subdata 1 detector 37 during tape data reproduction.

The information other than the PHID or SRID information rewritten in the above operations can store the same data previously recorded to the same tape (rewrite) period if it is generated as described above. The PHID or SRID is recorded in the case of the previous embodiment as described using FIG. 10A or 10B. Therefore, when a new PHID or SRID is recorded at the set signal level to a previously recorded tape, it is always possible to detect the recording start positions of the new and previously recorded data as described in the previous embodiment.

If an editable indexing ID is recorded as described above, it is possible to link other operations with the indexing ID. For example, it is possible to record a print command data associated with a PHID, and thereby print while reproducing a desired image. To enable this, when the ID data is recorded as shown in FIG. 11, the APID 118 is recorded with three bits instead of four, and the 1-bit thus saved is recorded as a PRM. That part of an image period recorded with a set PHID bit which is to be printed is therefore recorded with the PRM also set. By then connecting the recording and reproducing apparatus to a printer, the image recorded with a set PRM bit can be output to the printer when the set PRM bit period is detected by the ID data 1 detector during data reproducing.

A recording and reproducing apparatus with excellent ease of use can thus be provided by recording a PRM bit and linking operation to the PHID during tape reproduction modes. For example, it is possible to perform a high speed search for images recorded with the PHID set, and output the image to a printer if the PRM is also recorded set. Functions such as this are extremely useful with digital VCRs featuring an inherently high image quality.

Note that functions using this PRM bit shall not be limited to the above printer example, and the PRM bit can be used to, for example, transmit the image data to another storage media. In addition, the PRM recording position shall not be limited to the PHID set recording period. The PRM may be recorded to the reset signal level recording period immediately preceding or immediately following the PHID set recording period. In either case, such functions can be achieved insofar as the relationship to the PHID set recording period is fixed, and the association with the PHID can be maintained after PHID rewriting.

Next, the edit operation for indexing ID erasure (reset signal level rewriting) is described using the data structure shown in FIG. 4.

Figure 12A:
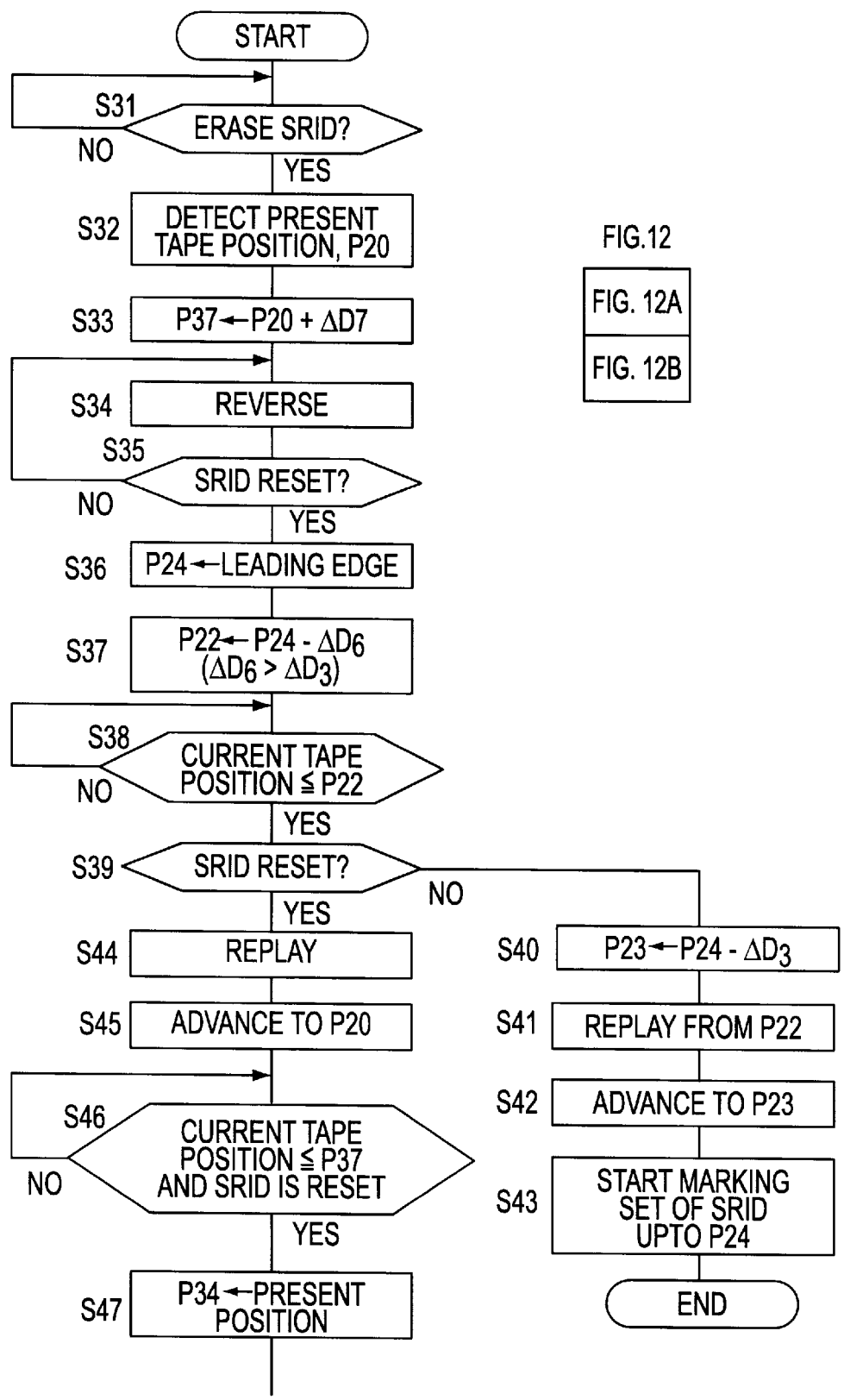

The editing indicator 33 is also programmed to carry out the operation shown in FIGS. 12A and 12B for erasing the old SRID. The SRID erasing operation will be described below in connection with FIGS. 12A, 12B, 13A and 13B.

Figure 13B:
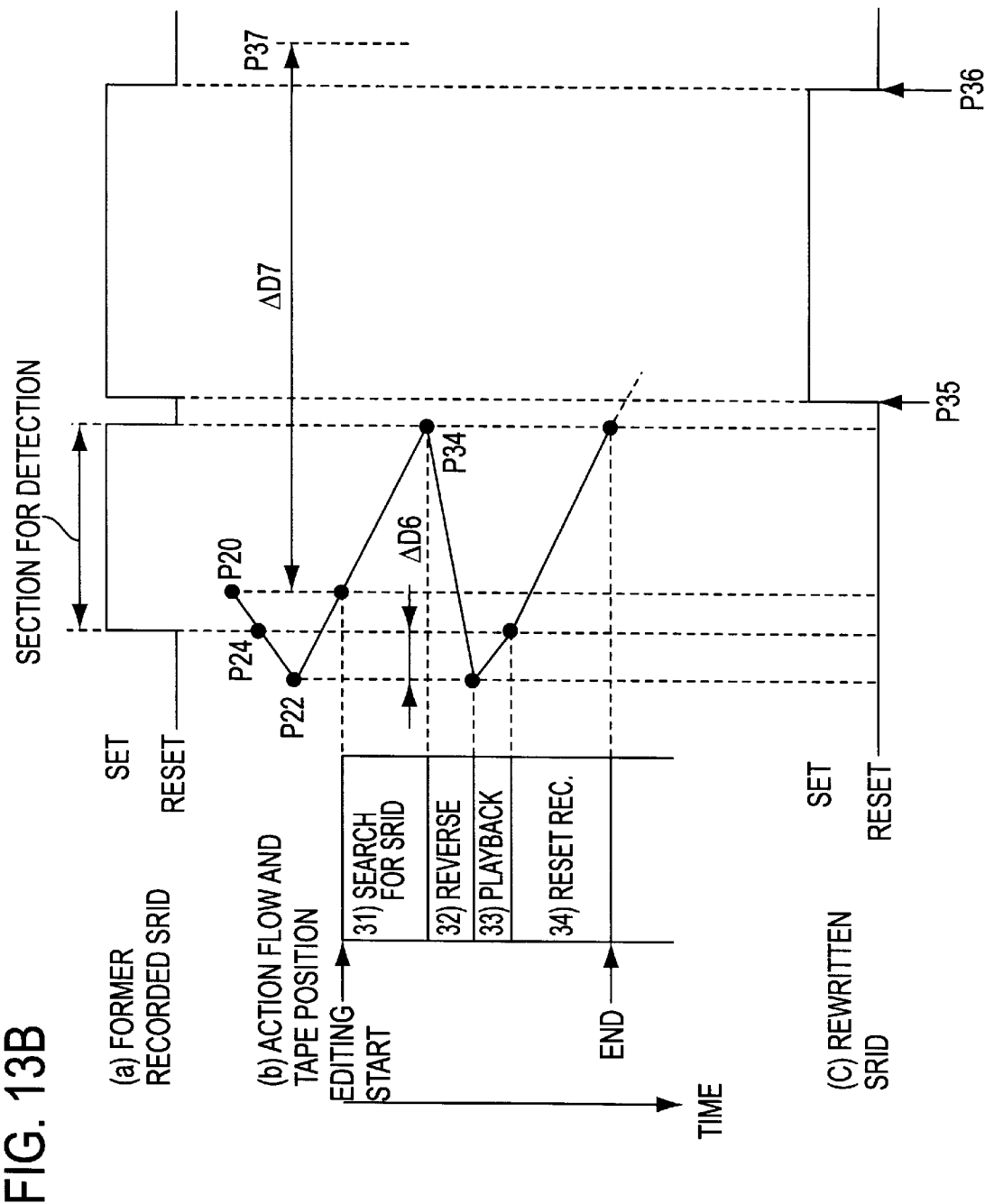

FIG. 13A shows a case when there is another previously recorded SRID marking immediately before the SRID marking which the user intends to erased, and FIG. 13B shows a case when there is no previously recorded SRID marking immediately before the SRID marking which the user intends to erased.

Referring to FIGS. 12A and 12B, before the start of the flow chart, it is to be noted that the tape is stopped at a position within the previously recorded SRID marking which the user intends to erase.

At step S31, it is detected whether or not an erase SRID command is produced by the depression of the erase SRID key 41. When the erase SRID command is detected, the program goes to step S32 at which the present tape position is detected and stored as data P20. At step S33, a predetermined tape advanced position P37 is calculated by adding P20 with a first predetermined amount ΔD7. At step S34, the tape is rewound until the leading edge of the set SRID is detected (step S35), and the detected position is stored as position P24 (step S36). A predetermined tape position P22 before the position P24 is calculated by subtracting a predetermined amount ΔD6 from position P24 (step S37). It is noted that ΔD6>ΔD3. Then, the tape is further retreated to position P22 (step S38).

Then, at step S39, it is detected whether the SRID at position P22 is reset, or not. If it is not reset, as in the case shown in FIG. 13A, the operation goes to step S40, but if it is reset, as in the case shown in FIG. 13B, the operation goes to step S44.

At step S40, a predetermined retreated position P23 from position P24 is calculated by subtracting the predetermined amount ΔD3 from position P24. Then, the tape is replayed from position P22 up to position P23 (steps S41 and S42). Then, at step S43, a new set data "1" of SRID marking is written up to the position P24.

By this operation, as understood from FIG. 13A, the two subsequent set SRID markings are joined to present one set SRID marking. In other words, the latter of the two subsequent set SRID markings is erased, and is absorbed in the former set SRID marking.

At step S44, the tape is replayed and advanced to position P20. Thereafter, the tape is further advanced and the trailing edge of the set SRID marking is detected (step S46). When the trailing edge of the SRID marking is detected, the trailing edge position is stored as position P34 (step S47). Thereafter, a fast rewind is effected to return the tape back to the position P22 (step S48). Then, the tape is replayed up to position P24 (step S49). Then, at step S50, a new reset data "0" of SRID marking is written up to the position P34 to eventually erase the former of the two subsequent set SRID markings.

The operation shown in FIG. 13A is further analyzed in detail below. In FIG. 13A, it is here assumed that the SRID as shown in FIG. 13A was previously recorded to tape. Also in FIG. 13A, period L21 is the SRID set period for indexing position P21 and is 60 frames long; period L22 (=ΔD3) is a 10 frame reset period; and period L23 is a 150-frame SRID set period for indexing position P24.

The SRID is normally recorded to a fixed length period from the position to be indexed. It is assumed here that an SRID set marking for indexing position P21 was previously recorded to a 150-frame fixed period (5 sec. equivalent) from position P21. After that, however, a reset marking was recorded to period L22 and the SRID set marking was recorded to the fixed period L23 to enable indexing a new position at position P24, resulting in the signal shown in FIG. 13A(a). It is to be noted that the length of the reset period L22 simply needs to be short relative to the length of the set signal period L23, and it is assumed in the following description to be equivalent to ten frames.

As a result of the SRID rewrite operation resulting in the above signal (FIG. 13A), the heads can be indexed to both position P21 and P24. Note, also, that the above operation is as described previously using FIG. 10B. The object of the operation described below is to erase the information for indexing to position P24.

The method conventionally used is described first. Because it is basically sufficient to erase the information for indexing to position P24, the conventional method Simply rewrites period L23 to the reset signal level. Doing so, however, results in the ID information for indexing to position P21 being only 60 frames long, significantly reducing the reliability of high speed search operations looking for position P21. The detection rate of the ID information during high speed searches is highly dependent upon the recording time of the ID set signal. To resolve this problem of the prior art, the method of the present invention is proposed as described below.

Only the outline of this operation is described below because the details of the operation are the same as described above with reference to FIG. 10A.

(21) Tape Rewinding and SRID Set Signal Recording Period Detection

The edit operation is assumed to begin from position P20. The first step is to rewind the tape while detecting the SRID from the signal reproduced during rewinding. Note that while in this example the SRID is detected to a position 15 frames before position P24, the length of this detection period is determined according to the length of the reset signal period L22 recorded during the SRID set signal rewrite operation. It is furthermore preferable to detect the SRID signal for a period slightly longer than the length of the reset signal period L22 (the reset signal period L22 is 10 frames in this example).

When it is detected that the SRID signal has changed from the reset to the set signal level, the tape is driven an additional 15 frames in the same direction and then stepped at position P22.

The case in which the SRID is not detected to change from the reset level to the set signal level within the 15 frame period preceding position P24 is described later.

(22) Tape Reproduction

The tape is then read to detect the subcode area data required when rewriting the SRID.

(23) SRID Reset Recording

The SRID is recorded at the set level in period L22 from position P23 to position P24.

The SRID signal shown in FIG. 13A is obtained from the above operation. In other words, the information needed for indexing to position P24 has been erased.

By erasing the information for indexing to position P24 in this way, the SRID signal-for indexing to position P21 is set for the period from position P21 to position P26, i.e., a period sufficiently long for good high speed search performance. The ability to conduct high speed searches for position P21 is thus maintained.

While the SRID period for indexing position P21 is longer than 150 frames (210 frames in this example) after the rewrite (erase) operation, this does not adversely affect the high speed search performance, it actually increases search efficiency, and therefore creates no problem. It is necessary to assume in subsequent rewrite operations that the SRID set signal is recorded to a period longer than the specified 150 frame period.

In addition, while in the above example the period L22 is rewritten to the set signal level, it is also possible to write the SRID set signal level for a 150-frame period from position P21, and to write a reset signal level following that 150-frame period. This case is also within the scope of the invention.

Note, further, that the above case applies when there is an SRID set signal period that must be preserved within a predetermined period before (15 frames in the above example) the recording position of the SRID to be erased. An alternative case wherein an SRID set signal period that must be preserved does not exist within the predetermined period before the recording position of the SRID to be erased is described below. More specifically, a reset-set signal level change in the SRID is not detected while rewinding the tape 15 frames from position P24. In this situation it is sufficient to record a reset signal level to the set signal period of the SRID to be erased.

Another example of the edit operation when erasing the indexing ID (reset signal rewrite) is described next with reference to FIG. 13B. In this example the indexing ID (SRID) set signal has been recorded to tape for five seconds (150 frames). The SRID has also been edited, resulting in the SRID signal shown in FIG. 13B(a): the set signal period from position P24 to P34 is 100 frames, the reset signal period from position P34 to P35 is 10 frames, and the set signal period from position P35 to P36 is 150 frames. The object of the following operation is to erase the SRID set signal from position P24 to position P34 on tape.

The conventional method is described first. Because it is basically sufficient to erase the information for indexing position P24, and because an SRID is recorded set for 150 frames, a reset signal level is simply recorded for 150 frames from position P24. In this case, the SRID set signal for indexing position P35 is erased (rewritten to the reset signal level).

As described above, the SRID after editing is not necessarily recorded to a continuous 150 frame period. To resolve this problem of the prior art, the method of the present invention is proposed as described below.

Only the outline of this operation is described below.
(31) The SRID erase (rewriting to the reset signal level) operation is started from position P20. The tape is first driven in a read mode to detect the SRID. The position of the SRID set-reset signal level change is detected and stored as position P34. Step (32) is then executed.
(32) The tape is then rewound to rewind end position P22, which is approximately ΔD6 before the start position P24 of the SRID set period to be erased. This position is determined to assure sufficient tape travel for tracking to be completed from position P22 to position P24. Tracking must be completed.
(33) The tape is then reproduced to detect the subcode area data required when rewriting the SRID.
(34) The SRID is recorded at the reset level from position P24 to position P34.

During the SRID reset level rewrite operation above, any positions at which the SRID signal changes from the set to the reset signal level are first detected, and the reset level is then recorded to a position (P34) before the reset recording period. If the SRID is reset in this way, it is possible to reset only the SRID set period to be erased, and the problem of also erasing other SRID set periods that are not to be erased (the period from position P35 to P36 in FIG. 13B) is eliminated. This method is extremely useful because the SRID set signal recording start position is extremely important for search and edit operations.

The above erasing method is also useful when the SRID set recording period to be erased is longer than the specified recording period. More specifically, incomplete erasing does not occur because the entire period to the end position of the SRID set recording period to be erased can be reliably rewritten to the reset signal level.

In the case of the above embodiment, the period from position P24 to P34 is reset, but it is also possible to write the reset signal level from position P24 to P35. In this case, however, after detecting position P34 in step (31), it is necessary to advance the tape in the reproduction mode for a predetermined number of frames to detect and store the position of position P35. It is preferable for this predetermined number of frames to be slightly more than the reset signal recording period recorded before the SRID set signal period (15 frames in this embodiment). If an SRID set signal recording start position cannot be detected within this predetermined number of frames from position P34, it is sufficient to simply record the reset level to position P34.

It is also possible to switch between the operations shown in FIGS. 13A and 13B as the situation requires. Step (21) may also be executed after step (31), i.e., it is possible to combine the operations shown in FIGS. 13A and 13B within the scope of the invention.

It is to be noted that the above embodiments have been described with respect to a two channel recording and reproducing apparatus, but the present invention shall not be limited to the combination or placement of rotating heads described above, and can be applied to various other combinations.

These embodiments are also described with a subcode area provided between the tracking signal area and video signal area, but the specific position of the subcode area on tape shall not be so limited. For example, the subcode area may be provided in the second half of the track after the video signal area seen in the head scanning direction within the scope of the invention.

The present embodiments are also described using a 30 frames/second video signal, but the number of frames shall not be so limited. One frame of the video signal is also described as being recorded in ten segments to ten tracks, but the invention shall not be limited to this number of segments.

The present embodiments are also described with reference to a video signal recording and reproducing apparatus, but the invention is obviously applicable to an audio signal recording and reproducing apparatus.

The present embodiments are also described with reference to two types of pilot signals for tracking, but pilot signals of four frequencies can also be used as in the 8-mm VCR format, the recording position of the pilot signal can be changed as in the DAT format with only one pilot signal used, and the pilot signal input method is also not limited to that described above.

Furthermore, tracking control in the invention is accomplished using a pilot signal frequency multiplexed to the tracking signal area at the beginning of the track, but it is also possible to record only the positioning information signal for editing operations to the tracking signal area and to use a control signal recorded to a linear track at the tape edge as in the conventional VHS video format for tracking control.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A recording and reproducing apparatus for recording a video signal and an indexing signal to separate video signal areas and subcode areas, respectively, of diagonal tracks formed on a tape by a rotating head, said apparatus comprising:

tape drive means for driving the tape;

an add command generator for generating an add command to add said indexing signal at a requested position;

an indexing signal control for setting and resetting said indexing signal;

recording means for recording the video signal to the video signal area and the indexing signal, if any, to a subcode area of each track of the tracks; and editing control means for controlling said indexing signal control in response to said add command, such that the tape is rewound past said requested position for a first predetermined length, after which the tape is driven in a forward direction for a second predetermined length shorter than said first predetermined length, the tape then being further driven in the forward direction for a third predetermined length equal to a difference between said first predetermined length and said second predetermined length for recording the tape with the indexing signal, corresponding to a reset state, until the tape reaches said requested position, the tape being further driven in the forward direction for recording the tape with the indexing signal, corresponding to a set state, for a fourth predetermined length, the indexing signal being preserved as long as a leading edge of the indexing signal does not appear within a predetermined distance.

2. A recording and reproducing apparatus as claimed in claim 1, wherein said reset state is recorded immediately before said add command is generated.

3. A recording and reproducing apparatus as claimed in claim 1, further comprising: video signal generator for generating a video signal in frames, each frame having a predetermined length.

4. The recording and reproducing apparatus according to claim 1, wherein said editing control means records said set state at a position on the tape where said add command is generated.

5. The recording and reproducing apparatus according to claim 4, wherein said reset state is recorded for a predetermined period of time before said set state.

6. The recording and reproducing apparatus according to claim 1, wherein said editing control means records said reset state over a predetermined portion of said previous set state.

7. A recording and reproducing apparatus for recording a video signal and an indexing signal to separate video signal areas and subcode areas, respectively, of diagonal tracks formed on a tape by a rotating head, said apparatus comprising:

a tape driver that drives the tape;

an add command generator that generates an add command to add said indexing signal at a requested position;

an indexing signal controller that sets and resets said indexing signal;

a recorder that records the video signal to the video signal area and the indexing signal, if any, to a subcode area of each track of the tracks; and an editing controller that controls said indexing signal controller in response to said add command, such that the tape is shifted past said requested position for a first predetermined length, after which the tape is driven in a forward direction for a second predetermined length shorter than said first predetermined length, the tape then being further driven in the forward direction for a third predetermined length equal to a difference between said first predetermined length and said second predetermined length for recording the tape with the indexing signal, corresponding to a reset state, until the tape reaches said requested position, the tape being further driven in the forward direction for recording the tape with the indexing signal, corresponding to a set state, for a fourth predetermined length, the indexing signal being preserved as long as a leading edge of the indexing signal does not appear within a predetermined distance.

* * * * *

UNITED STATES PATENT AND TRADEMARK OFFICE
CERTIFICATE OF CORRECTION

PATENT NO. : 6,026,211
DATED : February 15, 2000
INVENTOR(S) : A. NAKAMURA et al.

It is certified that error appears in the above-identified patent and that said Letters Patent is hereby corrected as shown below:

On the title page, Item [73], Assignee, "Matsushita Electric Industries, Ltd." should be —Matsushita Electric Industrial Co., Ltd.—

Signed and Sealed this

Thirty-first Day of October, 2000

Attest:

Q. TODD DICKINSON

*Attesting Officer*   *Director of Patents and Trademarks*